(12) United States Patent  
Larson et al.

(10) Patent No.: US 7,398,345 B2  
(45) Date of Patent: Jul. 8, 2008

(54) INTER-INTEGRATED CIRCUIT BUS ROUTER FOR PROVIDING INCREASED SECURITY

(75) Inventors: Thane M. Larson, Roseville, CA (US); Kirk Yates, Loomis, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 343 days.

(21) Appl. No.: 10/461,183

(22) Filed: Jun. 12, 2003

(65) Prior Publication Data

US 2004/0255071 A1    Dec. 16, 2004

(51) Int. Cl.  
*G06F 13/36* (2006.01)

(52) U.S. Cl. .................. 710/306; 710/305; 710/100; 710/9

(58) Field of Classification Search ......... 710/305–306, 710/100, 9, 26, 36; 709/238  
See application file for complete search history.

(56) References Cited

U.S. PATENT DOCUMENTS

| | | | |
|---|---|---|---|
| 5,243,699 A * | 9/1993 | Nickolls et al. ............. | 712/11 |
| 5,526,464 A | 6/1996 | Mermelstein | |
| 5,581,541 A | 12/1996 | Whetsel | |
| 5,613,157 A | 3/1997 | Davidson et al. | |
| 5,819,052 A | 10/1998 | Sonoda | |
| 6,199,137 B1 * | 3/2001 | Aguilar et al. ............. | 710/305 |
| 6,289,408 B1 | 9/2001 | Regal | |
| 6,510,522 B1 * | 1/2003 | Heinrich et al. ............. | 726/34 |
| 7,219,156 B1 * | 5/2007 | Brown et al. ............. | 709/238 |
| 2002/0116564 A1 * | 8/2002 | Paul et al. ............. | 710/301 |
| 2003/0079082 A1 * | 4/2003 | Sicola et al. ............. | 711/114 |
| 2003/0172244 A1 | 9/2003 | Nagaoka | |
| 2004/0019763 A1 * | 1/2004 | Lakhani et al. ............. | 711/206 |
| 2005/0071533 A1 * | 3/2005 | Adams et al. ............. | 710/309 |

FOREIGN PATENT DOCUMENTS

WO    WO 2004/063903 A2    7/2004

OTHER PUBLICATIONS

"Parallel Bus to I2C-Bus Controller"; Phillips Semiconductors; Data Sheet Jun. 14, 2002; pp. 1-27.

* cited by examiner

*Primary Examiner*—Mark Rinehart  
*Assistant Examiner*—Kim T Huynh

(57) ABSTRACT

An inter-integrated circuit port for providing increased security. An electrical connector for communicative coupling to an inter-integrated circuit bus is provided. A controller coupled to the electrical connector operates to control data communication through the electrical connector based on control information. A mask coupled to the controller provides the control information to the controller.

15 Claims, 24 Drawing Sheets

400

```
┌─────────────────────────────────────────────┐
│ Data For Communication On An I2C Bus Is Received │
│                    410                       │
└─────────────────────────────────────────────┘
                     │
                     ▼
              ◇ Approved? ◇ ─── NO ───┐
                     │                 │
                    YES                │
                     ▼                 │
┌─────────────────────────────────────┐│
│ Forward Data To I2C Bus Connection Interface │
│                    420              ││
└─────────────────────────────────────┘│
                                       │
                                       │
┌─────────────────────────────────────┐│
│  Reject Connection With I2C Bus Interface  │◄┘
│                    430              │
└─────────────────────────────────────┘
```

Mask settings for allowing destination address 20h and 21h

Do Not Care Register: 1111 1110 b
Address Register: 0010 0000 b

Allowed Addresses: 0010 000x b

710

Mask settings for allowing destination address 20h-27h

Do Not Care Register: 1111 1000 b
Address Register: 0010 0000 b

Allowed Addresses: 0010 0xxx b

24h (0010 0100b) XOR 20h (0010 0000b) = 04h (0000 0100b)
04h (0000 0100b) AND F8h (1111 1000b) = 00h (0000 0000b)

00h – Transmission through I2C port is permitted

730

28h (0010 1000b) XOR 20h (0010 0000b) = 08h (0000 1000b)
08h (0000 1000b) AND F8h (1111 1000b) = 08h (0000 1000b)

08h – Transmission through I2C port is not permitted

INTER-INTEGRATED CIRCUIT BUS ROUTER FOR PROVIDING INCREASED SECURITY

TECHNICAL FIELD

The invention relates to the field of data processing.

BACKGROUND ART

Numerous electronic circuits and systems are utilized to perform useful tasks. In the performance of these tasks, the electronic circuits and systems often communicate with one another via a communication bus. One type of communication bus is the inter-integrated circuit bus (I2C bus). The I2C bus provides a communication link between integrated circuits (ICs) and electronic systems. Traditionally, an I2C bus consists of two active wires referred to as the serial data line (SDA) and serial clock line (SCL).

Prior Art FIG. 1 is an illustration of I2C bus system 100 configured in an exemplary conventional arrangement wherein a management processor 110 manages communication access on I2C bus 115. The I2C bus 115 comprises an SCL line 112 and an SDA line 114 that provide bi-directional communication paths which are coupled to modular field replaceable units (FRUs) 120, 121, and 122. Pull-up resistors 135 and 137 are coupled to SCL line 112 and SDA line 114 respectively to establish a default state on each line. The FRUs can be a variety of components including a server blade, a server card, a driver, a memory, or complex function IC. The I2C bus can be used with an intelligent platform management interface (IPMI) or other I2C protocols.

Conventional I2C buses utilize a master-slave or master-master communication protocol for transmitting packets (e.g., well defined blocks of data comprising a header, data and a trailer) between devices coupled to the bus. Components (e.g., FRUs) coupled to the I2C bus have a unique address and can behave as a sender or receiver of data (e.g., depending on specific functionality of the device). With IPMI, each "intelligent" device on the bus acts as a master and utilizes a master-master communication protocol. A component (e.g., FRU 120), attempting to transmit information on the I2C bus while another master (e.g., the management processor) controls the bus, must adhere to the arbitration rules of I2C. Essentially, all devices that are attempting to gain control of the bus must also monitor the bus and back off as soon as the signals do not match what the individual device is attempting to write. Because the bus is pulled high by pull-up resistors, and only driven low by active devices, the device driving low wins control of the bus.

One major concern for communication systems is security maintenance. Preventing unintended and/or unauthorized entities from accessing information communicated on a bus is usually desirable. However, traditionally it is usually possible for unintended components to spoof communications on I2C busses. For example, communications on an I2C bus in a common chassis (e.g., a host-client situation wherein slots are rented in a common chassis) intended for components utilized by a first entity (e.g., a first company) can be received by another component utilized by a second entity (e.g., a competing company). More specifically, it is possible for a device to "spoof" the I2C bus to deliberately receive data (e.g., a competitor's confidential information) that was not destined for the particular "spoofing" device.

There are a number of issues that arise in maintenance of traditional I2C bus systems. For example, if there is a bus failure on a segment of an I2C bus, communications are typically lost to the components coupled to the bus even if the components are not on the segment that is lost. To provide proper maintenance it is usually beneficial to have a good understanding of the type and number of devices coupled to an I2C bus and traditionally this is manually performed which is labor intensive and often inconvenient, especially if the components are remotely located. It is also usually difficult to discover errors in a system and provide corrective directions. For example, it is traditionally difficult to detect and remedy a situation in which one device effectively "captures" the bus by becoming a master and continuously transmitting information to prevent others from using the bus. Capacitance characteristics of devices coupled to an I2C bus also often can make maintenance and reconfiguration difficult.

Components coupled to an I2C bus usually create a capacitive load on the I2C bus, which together with the pull-up resistors produce RC constant characteristics that impact attributes of signals communicated via the I2C bus. For example, signal waveforms can be altered and the ability of components to distinguish between logical ones and zeroes impacted. As a result, it is desirable maintain an appropriate balance between the capacitive and resistive characteristics of the I2C bus lines. However, maintaining a capacitive and resistive balance can be difficult when adding or deleting components dynamically since the number and type of components on a bus impact the capacitive characteristics. Traditional attempts at achieving a balance usually limited the number of components coupled to an I2C and often involve costly bus redesign, which if done incorrectly can cause bus interrupts, or possibly catastrophic bus failure.

In current I2C bus systems, each component is assigned an I2C address. For example, with reference to FIG. 1, FRU 120, FRU 121 and FRU 122 each have an assigned I2C address. As described above, consider a situation where FRU 120 is operated by the first entity and FRU 121 is operated by the second entity. If the second entity desires to access data being transmitted to FRU 120, FRU 121 may spoof current I2C bus systems into believing it is FRU 120 by using the I2C address of FRU 120.

The I2C bus according to the conventional art also suffers from the inability to detect the presence of a device (e.g., field replaceable unit) coupled thereto, the inability to determine if the device coupled thereto is functional and/or the inability to reset the device when an error occurs. Furthermore, the I2C bus according to the conventional art also suffers from the inability to provide for readily analyzing and debugging data traffic on the I2C bus. The serial two-line I2C bus is difficult to trap events on, because a serial data pattern must be trapped. In addition, it is also difficult to detect what device is the source device; only the destination device address can readily be trapped.

SUMMARY OF THE INVENTION

Various embodiments of the invention, an inter-integrated circuit port for providing increased security, are described herein. An electrical connector for communicative coupling to an inter-integrated circuit bus is provided. A controller coupled to the electrical connector operates to control data communication through the electrical connector based on control information. A mask coupled to the controller provides the control information to the controller.

BRIEF DESCRIPTION OF THE DRAWINGS

The invention is illustrated by way of example and not by way of limitation, in the figures of the accompanying drawings and in which like reference numerals refer to similar elements and in which:

Prior art

FIG. 4 shows a flow diagram of a process for controlling communication on an I2C router in accordance with an embodiment of the invention.

FIG. 7A shows an exemplary mask register settings in accordance with an embodiment of the invention.

FIG. 7B shows an exemplary comparison of control information and destination addresses in accordance with an embodiment of the invention.

DETAILED DESCRIPTION OF THE INVENTION

Reference will now be made in detail to the embodiments of the invention, examples of which are illustrated in the accompanying drawings. While the invention will be described in conjunction with these embodiments, it will be understood that they are not intended to limit the invention to these embodiments. On the contrary, the invention is intended to cover alternatives, modifications and equivalents, which may be included within the spirit and scope of the invention as defined by the appended claims. Furthermore, in the following detailed description of the present invention, numerous specific details are set forth in order to provide a thorough understanding of the present invention. However, it is understood that the present invention may be practiced without these specific details. In other instances, well-known methods, procedures, components, and circuits have not been described in detail as not to unnecessarily obscure aspects of the present invention.

Inter-Integrated Circuit Router

Figure 1:
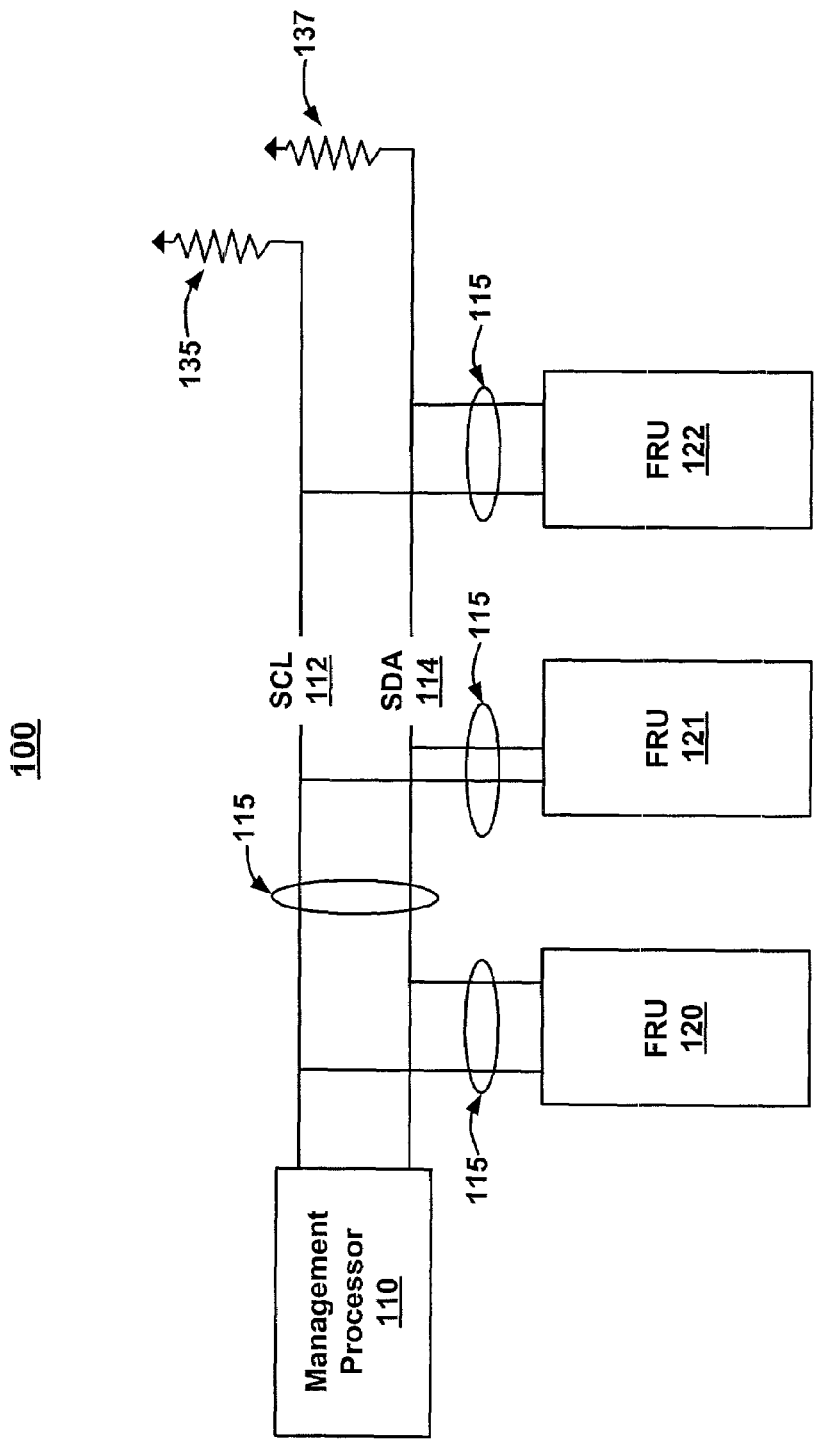
FIG. 1 shows a block diagram of a conventional inter-integrated circuit bus system according to the conventional art.
Figure 2:
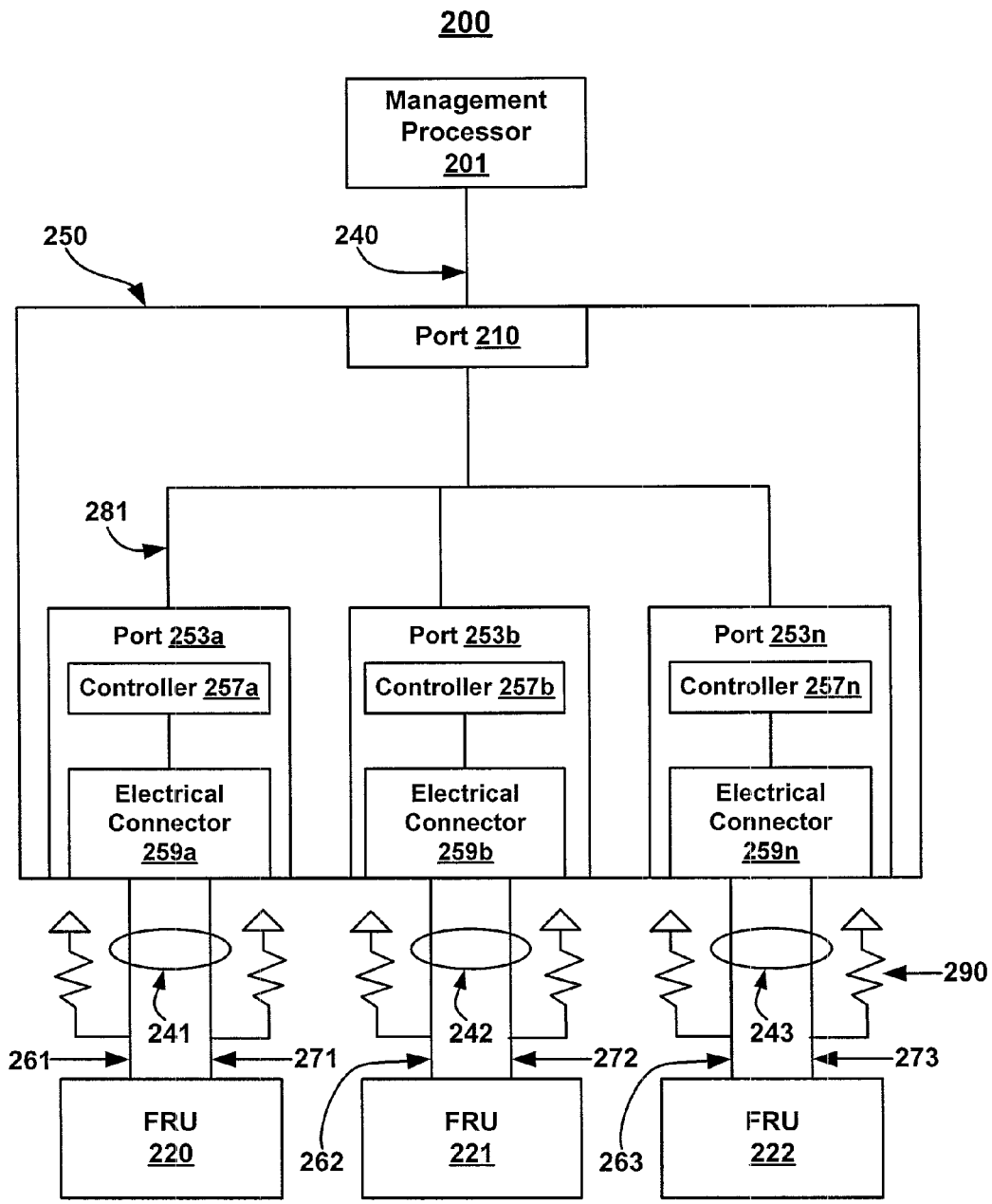
FIG. 2 shows a block diagram of an inter-integrated circuit bus system comprising an inter-integrated circuit router in accordance with an embodiment of the invention.

Referring now to FIG. 2, a block diagram of an inter-integrated circuit (I2C) router system 200, in accordance with an embodiment of the invention, is shown. The exemplary I2C router system 200 comprises a management processor 201, an I2C router 250 and a plurality of field removable units (FRUs) 220, 221 and 222. Management processor 201 is coupled to I2C router 250 by high-speed external bus 240. The FRUs 220, 221 and 223 are coupled to I2C router 250 by electrically isolated I2C bus sections 241, 242 and 243, respectively. Each I2C bus section 241, 242, and 243 comprises a SDA line and a SCL line. For example, SDA line 261 and SCL line 271 of I2C bus section 241 communicatively couple FRU 220 to I2C router 250, SDA 262 and SCL line 272 of I2C bus section 242 communicatively couple FRU 221 to I2C router 250, and SDA line 263 and SCL line 273 of I2C bus section 243 communicatively couple FRU 222 to I2C router 250. Pull-up resistors (e.g., pull-up resistor 290) are coupled to the SDA lines and the SCL lines (e.g., SCL line 273).

Exemplary I2C router 250 comprises high-speed external port 210, high-speed internal bus 281, I2C ports 253a, 253b, and 253n. It should be appreciated that I2C router 250 may comprise any number of ports, and is not limited to this embodiment. High-speed internal bus 281 is coupled to high-speed external port 210, and I2C ports 253a, 253b, and 253n. In one embodiment, each I2C port 253a, 253b and 253n includes a controller 257a, 257b and 257n coupled to an electrical connector 259a, 259b and 259n respectively.

In one embodiment, the components of exemplary I2C router 250 cooperatively operate to provide security for communications between I2C bus sections (e.g., I2C bus sections 241, 242 and 243) coupled to I2C router 250 by controlling communications through the ports included in I2C router 250. The electrical connectors 259a, 259b and 259n communicatively couple the respective I2C bus sections 241, 242 and 243 to I2C router 250. In one exemplary implementation, each electrical connector includes a serial data pin and a serial clock pin. Controllers 257a, 257b and 257n control data communication flow through corresponding electrical connectors 259a, 259b and 259n and prevent the electrical connectors from gaining unauthorized access to data (e.g., data communicated on internal high speed bus 281). In one embodiment of the invention, a controller can be a field programmable gate array, a microprocessor, etc.

Preventing the electrical connectors from gaining unauthorized access to data provides additional security for external components or devices (e.g., FRUs 220, 221 and 222) utilizing I2C router 250 to communicate with each other. For example, controller 257a prevents spoofing of data off internal high-speed bus 281 for communication through electrical connectors 259a and onto I2C bus 241. The inter-integrated circuit ports can stop information from being communicated to an I2C bus section if a FRU coupled downstream of the inter-integrated circuit port is not authorized to receive said information. Thus, an entity (e.g., a company) or entities (e.g., a supplier and a purchaser) with control of devices (e.g., FRUs 220 and 222) coupled to respective bus sections (e.g., 241 and 243) can communicate information to each other without illicit spoofing of the information by unauthorized or unapproved entities (e.g., a competitor) with control of a device (e.g., FRU 221) coupled to a separate bus section (e.g., 242). The unauthorized or unapproved entity can not receive the information illicitly because a present invention controller (e.g., 257b) prevents the information from being communicated via a corresponding electrical connector (e.g., 259b).

High-speed internal bus 281 provides an internal communication path for components of I2C router 250. It is appreciated that high-speed internal bus 281 can be a parallel bus or any other high-speed bus compatible with various configurations of the invention. High-speed internal bus 281 communicates information between each of the I2C ports 253a, 253b and 253n and also high-speed external port 210. The communication speed of high-speed internal bus 281 can be different than the external communication speed of the respective ports. Optionally, ports 253a, 253b, 253n and/or 210 comprise a cache memory for buffering information communicated on the respective port. The combination of the caches and a high-speed internal bus allow multiple ports to communicate information to and from I2C router 250 simultaneously.

The size of a cache can be configured in accordance with a variety I2C router 250 implementations. For example, if I2C router 250 is used in a configuration utilizing an intelligent platform management interface (IPMI) protocol in which the IPMI limits packets to 32 bytes, the cache can be sized as a multiple of the packet size (e.g., 64 bytes, 96 bytes, etc.). Additional flexibility can be achieved in embodiments of the invention that utilize retry schemes and flow control schemes to help handle overflow conditions. For example, when a cache associated with a particular port reaches a predetermined capacity, a programmed overflow control routine can interrupt the bus and allow the port to dump its memory to prevent errors.

In one embodiment of the invention, the inter-integrated circuit ports of I2C router 250 provide segmentation or separation of the I2C bus sections 241, 242 and 243 from each other. The inter-integrated circuit ports electrically isolate the I2C bus sections from each other. For example, ports 253a, 253b, and 253n electrically isolate I2C bus sections 241, 242 and 243 from each other. Electrically isolating the I2C buses facilitates hot swapping of devices (e.g., FRU 220, 2221, and 223) coupled to the I2C bus sections. In one exemplary implementation, the electrical isolation of the I2C bus sections permit swapping of the FRUs without requiring changes to pull-up resistors (e.g., pull-up resistor 290) to accommodate a change in capacitance on the impacted I2C bus section.

Furthermore, by electrically isolating devices on an I2C bus, the invention beneficially provides each bus section coupled to I2C router 250 greater flexibility with regard to the type and or number of devices coupled to a bus section before reaching a capacitance limit (e.g., 400 pF, I2C specification limits, etc.). Thus, overall capacitance limitations are more flexible than if a conventional I2C bus were used. Segmenting and electrically isolating the I2C bus sections also facilitates preservation of I2C functionality even when a device (e.g. a FRU) coupled to one of the I2C bus sections fails. If a device (e.g., FRU 221) coupled to one I2C bus section (e.g., I2C bus section 242) fails it does not preclude other devices (e.g., FRU 220 and 222) coupled to other I2C bus sections (e.g., 241 and 243) from communicating with one another.

In one embodiment of the invention, I2C router 250 is a packet-based router wherein several bytes are read on a port at the same time (e.g., waiting for an I2C STOP condition) and then transferred to another port in I2C router 250. Each port in I2C router 250 can recognize valid I2C communication protocol behavior on coupled I2C buses (e.g., 241, 242 and 243) and I2C router 250 can handle I2C hand shaking as appropriate. In one exemplary implementation, I2C router 250 can permit devices coupled to different I2C ports to communicate with I2C router 250 simultaneously, eliminating the traditional requirement that a device necessarily wait until the sections of an I2C bus are free. In one embodiment, the FRUs or devices coupled to the ports of I2C router 250 operate normally as they would on a conventional I2C bus and the presence of the I2C router 250 is transparent to the FRUs or devices.

With reference still to FIG. 2, high-speed port 210 in I2C router 250 can be coupled to external devices via high-speed external bus 240. It is appreciated that the high-speed external bus 240 can be a parallel port bus, a high speed I2C bus, or any other high-speed bus. Again, I2C router 250 optionally comprises a buffer for caching data received from another port (e.g., I2C port 220, 221 and/or 222) and pumping the data onto high speed external bus 240, thus allowing multiple devices coupled to I2C router 250 to communicate simultaneously.

In one embodiment of the invention, the electrical connectors 259a, 259b and 259n are I2C bus couplers for communicatively coupling to I2C buses 241, 242 and 243 respectively. In one exemplary implementation, controller 351 is a port management component coupled to the I2C bus couplers via high-speed internal bus 375 (not 243). The port management component manages data communication flow through the I2C bus couplers, including preventing said I2C connector from illicitly accessing said data.

It will be appreciated that the invention is readily adaptable to a variety of implementations. In one embodiment, a controller (e.g., 257a) associated with a first port (e.g., 253a) prevents information from a second port (e.g., 253b) from being communicated via the first port to an electrical connector (e.g., 259a) unless the information from the second port is addressed to the first port or an external device (e.g., FRU 220) coupled to the first port. In yet another embodiment, a controller (e.g., 257a. 257b, 257n) also prevents an I2C port from sending data to another I2C port.

Figure 3:
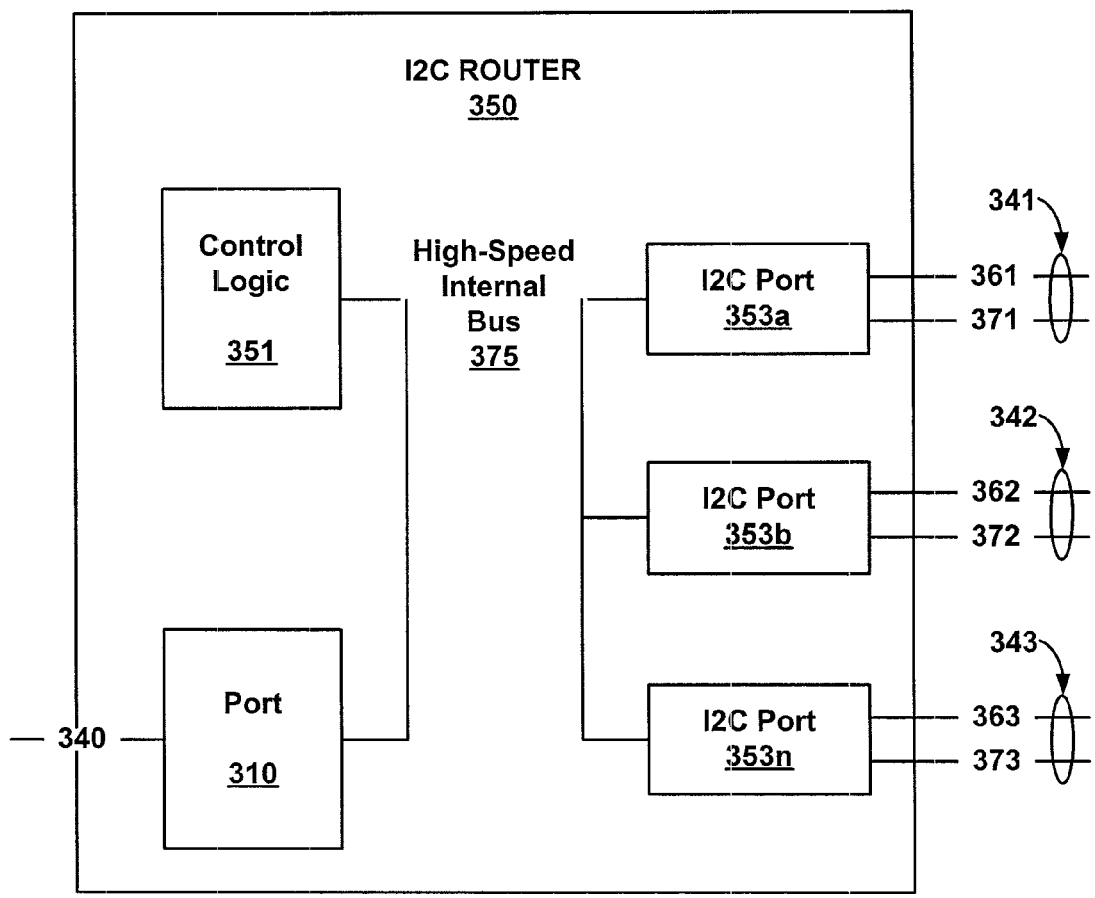
FIG. 3 shows a block diagram of an inter-integrated circuit router in accordance with an embodiment of the invention.

Referring now to FIG. 3, a block diagram 300 of an inter-integrated circuit (I2C) router 350, in accordance with an embodiment of the invention, is shown. The I2C router 350 is similar to I2C router 250 except I2C router 350 has a single controller 351 instead of a controller in each of the ports 353a, 353b and 353n. The I2C router 350 comprises high-speed internal bus 375, controller 351, external high-speed port 310, and I2C ports 253a, 253b, and 253n. High-speed internal bus 375 is coupled to controller 351, high-speed external port 310, and I2C ports 253a, 253b, and 253n. It is appreciated that high-speed internal bus 375 can be bi-directional. It is also appreciated that I2C router 350 can include any number of ports (e.g., sixteen individual I2C ports). Controller 351 controls data communication flow through corresponding ports 353a, 353b and 353n and prevent the ports from gaining unauthorized access to data (e.g., data communicated on internal high seed bus 375). In one embodiment of the invention, a controller can be a field programmable array, a microprocessor, etc.

Factors such as cost may influence the configuration of a router, such that a port may have its own controller therein or each port may share a central controller, depending on cost objectives. In accordance with embodiments of the invention, a single unit, such as a field programmable gate array (FPGA), may be used control all of the ports in a router, wherein its general purpose input/output pins are used as I2C busses, thus creating I2C ports therein.

The invention is readily adaptable for use in a variety of I2C bus configurations (e.g., a system compatible with the I2C specification provision for 127 addresses that can be written on a single I2C bus). In one embodiment of the invention I2C router can block communications to port addresses in both directions (e.g., receiving data and transmitting data) for any port on an I2C router. For example, suppose port 253a is only allowed to communicate with port 253b and port 253b is only allowed to communicate with port 253a. Any packet from port 253a to any other address (e.g., port 253n is not routed through I2C router 250. Consequently, the number of I2C devices supported by the I2C router 250 is increased to 127 times the number of ports on the router. For example, if I2C router 250 has 16 ports, the number of available addresses would be 2032, thus allowing up to 2032 devices to be coupled to a 16 port I2C router.

Referring now to FIG. 4, a flow diagram 400 of a process for controlling communication on an inter-integrated circuit (I2C) router, in accordance with an embodiment of the invention, is shown. In accordance with an embodiment of the invention, the router controls communication between ports by limiting the ability of ports to spoof information.

In step 410 data for communication on an I2C bus connection interface is received. In embodiment of the invention, an I2C bus connection interface is associated with an I2C connector address. A determination is made if a destination address included in the data corresponds to the I2C connector address. For example, a received data packet is examined and an origin address and a destination address are identified in the header portion of the data packet. If the data corresponds to the I2C connector address an analysis is performed to analyze if the I2C connection interface is approved to communicate the data. In one exemplary implementation the data is received from a server blade via and I2C bus section. It is appreciated that data can be received on a first bus connection interface of an I2C router (e.g., from a high-speed external bus, an external I2C bus, etc.), wherein the data is destined for a second bus connection interface included in the I2C router.

In step 420, the data is forwarded on the I2C bus connection interface if the I2C bus connection interface is approved for communicating the data. In one embodiment of the invention, the data is forwarded via an I2C bus section to a device (e.g., a FRU).

In step 430, communication of the data on the I2C connection interface is prohibited if the I2C bus connector is not approved. Prohibiting communication on the I2C interface provides additional security for external components or devices (e.g., FRUs 220, 221 and 222 from FIG. 2) by preventing "spoofing" on the I2C bus.

In one embodiment of inter-integrated circuit (I2C) communication control method 400 the I2C bus connection interface is utilized to divide an I2C bus into different sections. For example, the I2C bus connection interface is utilized to electrically isolate a section of an I2C bus. In one exemplary implementation in which the I2C bus connection interface is utilized to divide an I2C bus into different section, hot swapping of a component coupled to the I2C bus connection interface is permitted without changing pull-up resistance(e.g., pull-up resistor 290 from FIG. 2).

Figure 5:
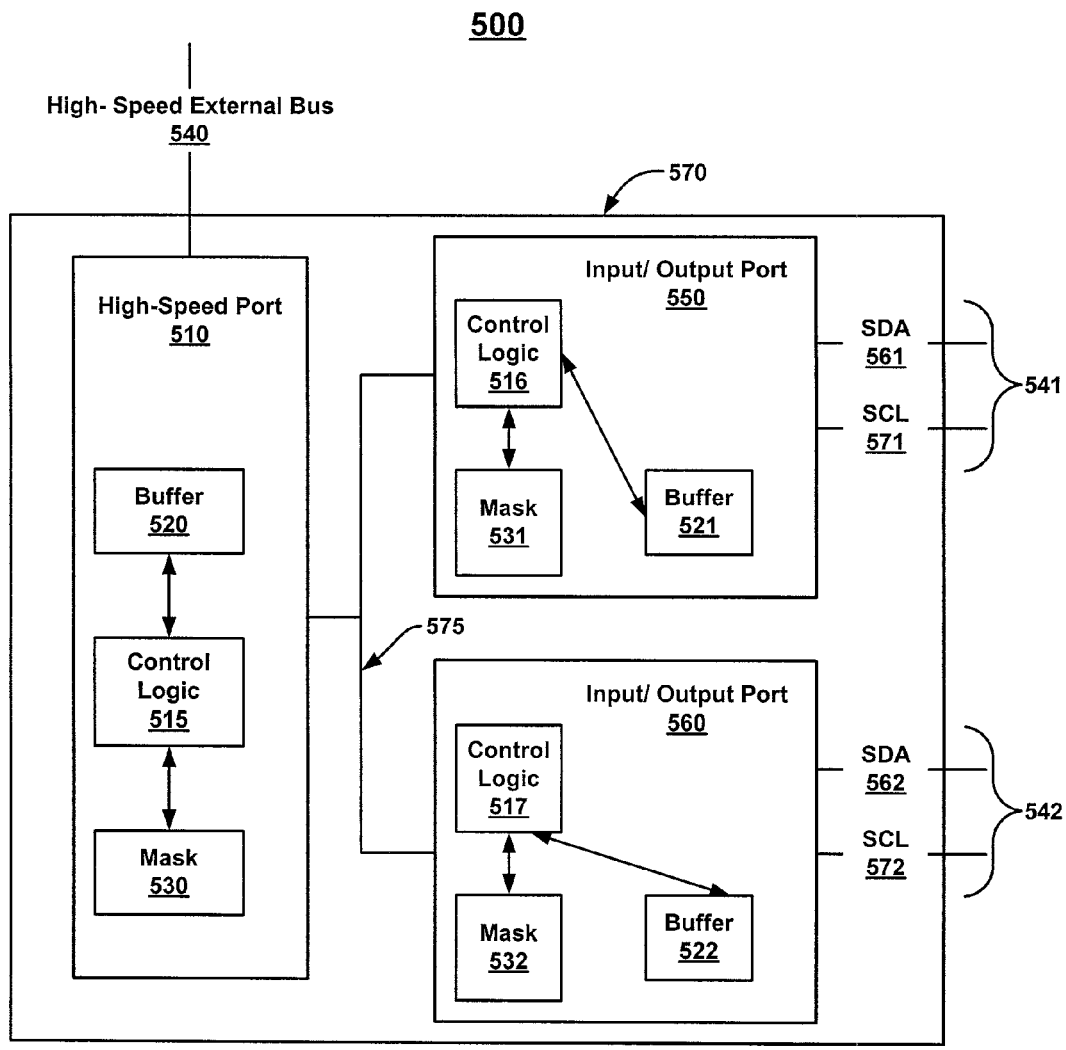
FIG. 5 shows a block diagram of an inter-integrated circuit router in accordance with an embodiment of the invention.

Referring now to FIG. 5, a block diagram of an inter-integrated circuit (I2C) router, in accordance with embodiments of the invention, is shown. Router 570 comprises a high-speed port 510. High-speed port 510 interfaces the router with high-speed external bus 540. It is appreciated that high-speed bus 540 can be a high-speed I2C bus, a parallel bus, or any other high speed bus known in the art. In one embodiment in accordance with the invention, high-speed bus 540 is an 8 wire parallel bus.

High-speed port 510 comprises control logic 515 for controlling communications on high-speed internal bus 575. Control logic is coupled to mask 530 wherein mask 530 provides control information to control logic 515. High-speed port 510 also includes an optional buffer 520 for buffering communications on high-speed internal bus 575. As stated above, overflow routines and buffering schemes can be implemented by control logic 515 to protect against errors resulting from data overflow. Optionally, high-speed port 510 comprises an error register and a corresponding system event log. The error register tracks errors on the router and the system event log organizes the errors and can provide reports.

Coupled to the high-speed internal bus 575 is a plurality of I2C ports. For clarity, FIG. 5 illustrates two I2C ports 550 and 560. Port 550 comprises control logic 516 and a mask 531. Control logic 516 controls communication on port 550. Mask 531 provides control information to control logic 516. It is appreciated that mask 531 can be programmed using software or can be programmed manually with an I2C dual inline plug (DIP) switch. Mask 531 provides port addresses for which port 550 can send data. If the port tries to send data to an address not allowed in mask 531, the data will not enter router 570. It is appreciated that each I2C port also includes an I2C controller for controlling I2C protocol. It is appreciated that Port 560 is configured similarly to Port 550 wherein port 560 comprises control logic 517, mask 532 and an optional buffer 522. In accordance with embodiments of the invention, multiple ports on router 570 share central control logic and a central mask. In a centralized configuration, a single processor and a single mask can control communication on high-speed internal bus 574

Coupled to I2C port 550 and port 560 are SDA line 561, SCL line 571, SDA line 562 and SCL line 572, respectively, for providing a conventional I2C bus connection for a device to couple thereto. Port 550 is coupled to I2C bus 541 and port 560 is coupled to I2C bus 542. In accordance with an embodiment of the invention, I2C port 550 also includes an optional detection line for detecting the presence of a device coupled thereto. Furthermore, an optional reset line is coupled to port 550 for resetting a non-responsive device coupled to the port. A reset line can provide means to reset a device that is causing errors on router 570. In one embodiment of the invention, high-speed port 510 comprises debug logic wherein debug logic can toggle a reset line coupled to a device producing errors on the router to reset the non-responsive device.

In accordance with embodiments of the invention, ports coupled to router 570, for example ports 550 and 560, can communicate with router 570 at different speeds. For example, a device coupled to port 550 may only be capable of communicating at 100 kb/s wherein port 560 may have a device coupled thereto that is capable of communicating at 1.4 mb/s. Internal high-speed bus 575 provides bandwidth such that devices coupled to I2C ports on router 570 to communicate at high-speeds.

As stated above, the invention uses control logic and an address mask to provide security on an I2C bus by controlling communication on ports that segment an I2C bus. Beneficially, devices coupled to the ports on the router 570 operate normally as they would on a conventional I2C bus and they are unaware of the router 570. Advantageously, the router 570 electrically segments an I2C bus from one device to another and beneficially, only packets aimed for a particular source on a particular port get forwarded to that port.

In addition to providing security on an I2C bus, the invention electrically isolates devices on an I2C bus to allow for hot swapping. As opposed to conventional I2C bus implementation wherein all devices share a single bus and are attached thereto, the invention advantageously electrically isolates devices coupled to the router. Thus, any failing device on the bus will not affect other devices on other ports. In addition, segmenting an I2C bus and electrically isolating devices on the I2C bus allows for hot swapping of devices on the I2C bus without requiring changes to pull-up resistors to accommodate for a change in capacitance on the bus. Furthermore, by electrically isolating devices on an I2C bus, the invention provides each port on the router to approach the 400 pF capacitance limit of I2C specification. Thus, each segment or port can require less stringent capacitance requirements than if a conventional I2C bus were used.

A Process for Securely Controlling Data Communication at an Inter-Integrated Circuit Port With reference to FIG. 5, in overview, embodiments of the invention provide a process for securely controlling data communication through I2C router 570. In one embodiment, I2C router 570 comprises I2C port 550, I2C port 560 and high-speed port 510. It should be appreciated that I2C router 570 may comprise any number of I2C ports, and is not limited by the embodiment illustrated in FIG. 5. For example, I2C router 570 may comprise sixteen I2C ports. Each I2C port is coupled to high-speed internal bus 575.

In one embodiment, each I2C port comprises a controller (e.g., control logic 516 of I2C port 550 and control logic 517 of I2C port 560) and a mask register (e.g., mask 531 of I2C port 550 and mask 532 of I2C port 560). The controller is operable to control data communication through the I2C port based on control information provided by the mask register. In one embodiment, the mask register is stored within random access memory (e.g., RAM) of the controller (e.g., control logic 516). The control information designates data communication that is permitted to be transmitted through the I2C port. In one embodiment, the control information designates an I2C address to which data can be transmitted through the I2C port.

In one embodiment, I2C router 570 comprises logical circuitry to compare an address to the control information. In one embodiment, the logical circuitry comprises an exclusive-OR (XOR) and AND logic circuit for comparing an address to the control information. The XOR and AND logic circuit may be comprised within control logic (e.g., control logic 515, 516 and 517).

In one embodiment, I2C router 570 comprises a port identification tag (PIT) register. Once an I2C port, or a set of I2C ports, is identified as being a recipient of a particular data communication, an access validation is indicated in the PIT register. In one embodiment, the PIT register is stored within RAM of the controller (e.g., control logic 516). It should be appreciated that the PIT register comprises at least as many bits as there are ports in I2C router 570. An access validation is indicated as a '1' in the PIT register.

Figure 6A:
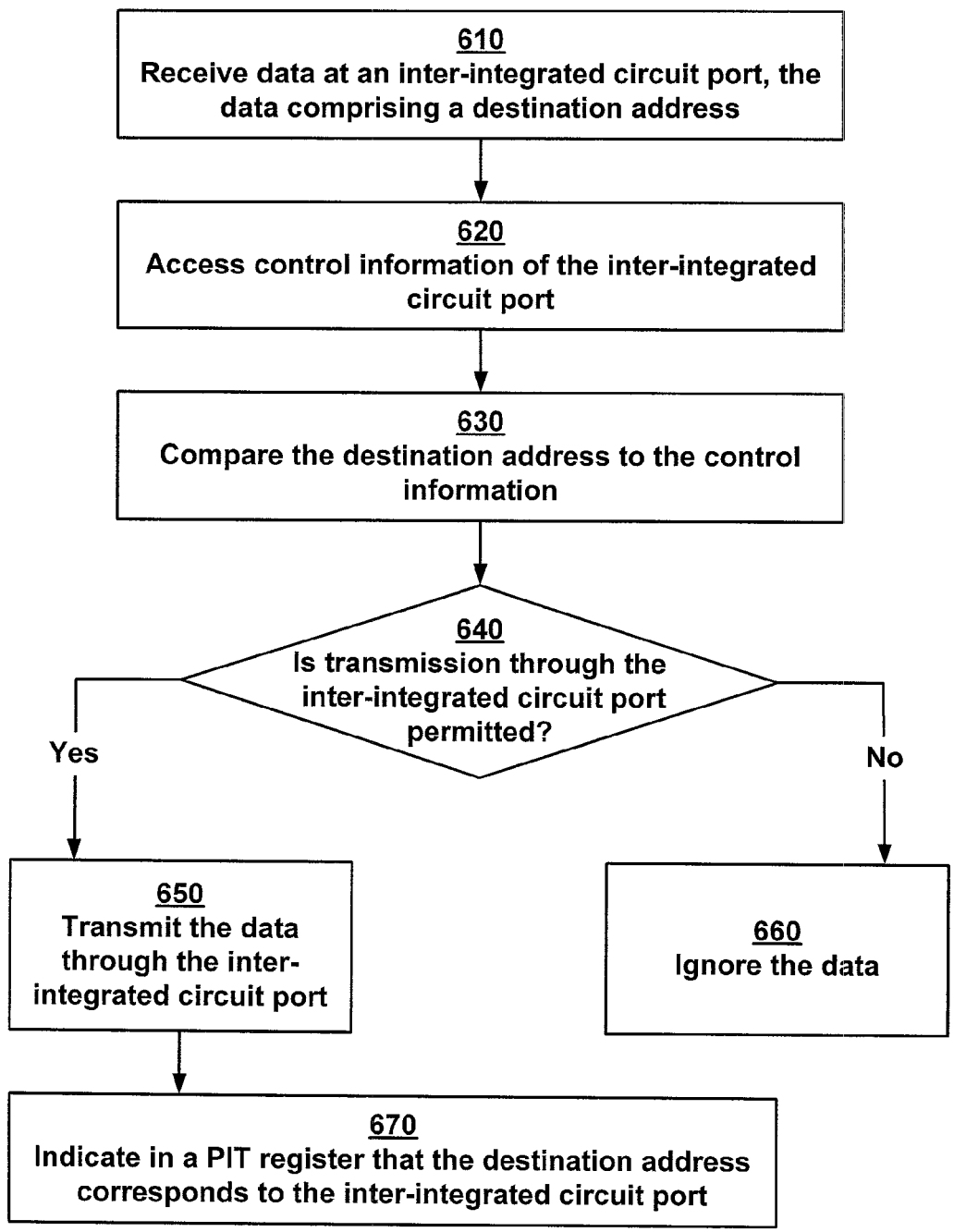
FIG. 6A shows a flow diagram illustrating a process for securely controlling data communication at an inter-integrated circuit router in accordance with an embodiment of the invention.

Referring now to FIG. 6A, a flow diagram of a computer implemented process 600 for securely controlling data communication at an inter-integrated circuit (I2C) port in accordance with an embodiment of the invention, is shown. In one embodiment in accordance with the invention, process 600 is performed at an inter-integrated circuit port (e.g., I2C port 550 of FIG. 5). Although specific blocks are disclosed in process 600, such blocks are exemplary. That is, the embodiments in accordance with the invention are well suited to performing various other blocks or variations of the blocks recited in FIG. 6A.

At step 610 of process 600, data is received at an I2C port of an I2C router (e.g., I2C router 570 of FIG. 5), wherein the data comprises a destination address. In one embodiment, the data is a data packet comprising a header and a payload. The destination address is comprised within the header. To securely control data communication through the I2C port, and to prevent address spoofing, destination address must be validated at the I2C port. In one embodiment, the destination address is one byte.

At step 620, control information of the I2C port is accessed. As described above, the control information designates whether data intended for a particular destination address is permitted to be transmitted through a particular I2C port. In one embodiment, the control information comprises an I2C address. In another embodiment, the control information comprises a range of I2C addresses.

In one embodiment, the control information is stored within a mask register (e.g., mask 531 of FIG. 5). In one embodiment, the mask register is stored within random access memory (e.g., RAM) of the controller (e.g., control logic 516). The mask register is set to allow communications through an I2C port or through a range of I2C ports. In one embodiment, the mask register of an I2C port is set to a single I2C address. In another embodiment, the mask register of an I2C port is set to a range of I2C address.

It should be appreciated that a mask register can comprise any number of bytes for storing any number of I2C addresses. In one embodiment, mask 530 of high speed port 510 is set to allow communications to address 20h (hexadecimal notation). The mask registers of other I2C ports of I2C router 570 may initially be set to a single I2C address. The mask registers can be managed to account for personalized settings for storing multiple I2C addresses.

In one embodiment, the mask register is one byte for storing a single I2C address. In another embodiment, the mask register is two bytes for storing a range of I2C addresses. FIG. 7A illustrates exemplary mask register settings 700 and 710 of a two byte mask register in accordance with embodiments of the invention.

The mask registers as depicted in FIG. 7A comprise two registers, a Do Not Care register and an Address register. The Address register is for indicating an I2C address. The Do Not Care register is for indicating the bits of the Address register are used for indicating an allowable destination address. Each '1' in the Do Not Care register indicates a bit that is used and each '0' in the Do Not Care register indicates a bit that is not used. The Do Not Care register and the Address register are operable to provide a single I2C address or a range of I2C addresses.

Mask register setting 700 illustrates an exemplary mask setting for allowing a destination address of 20h. As shown, the Do Not Care register is set to 1111 1110 (binary notation) and the Address register is set to 0010 0000b. Since every bit of the Do Not Care register except the last is set to 1, every bit of the Address register is used to determine the allowed destination address. Therefore, the only allowed addresses are 0010 000xb (20h and 21h). It should be appreciated that only the first seven bits of address space are used. The last bit of the byte determines whether the access is read/write.

Mask register setting 710 illustrates an exemplary mask setting for allowing destination addresses 20h-27h. As shown, the Do Not Care register is set to 1111 1000b (F8h) and the Address register is set to 0010 0000b. Since the last three bits if the Do Not Care register are set to 0, an allowed destination address may be 0010 0xxxb, where x may be a 1 or a 0. Therefore, the allowed addresses are in the range of 20h-27h. As with mask register setting 700, only the first seven bits of address space are used. The last bit of the byte determines whether the access is read/write.

With reference to FIG. 6A, at step 630, the destination address is compared to the control information. The control information indicates whether the destination address is allowed for transmission through the I2C port.

Figure 6B:
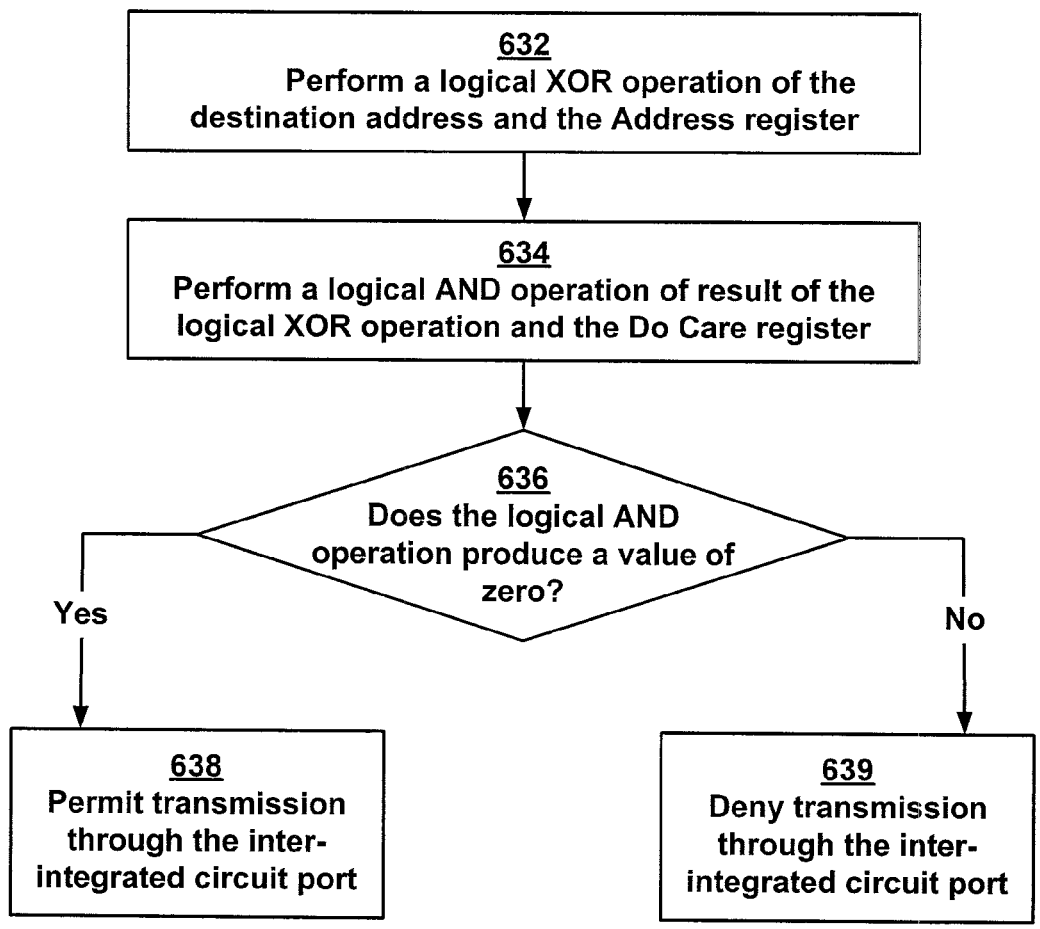
FIG. 6B shows a flow diagram illustrating a process for comparing a destination address to control information in accordance with an embodiment of the invention.

Referring now to FIG. 6B, a flow diagram of a process 630 for comparing a destination address to control information, in accordance with an embodiment of the invention, is shown. In one embodiment in accordance with the invention, process 630 is performed at an inter-integrated circuit port (e.g., I2C port 550 of FIG. 5). Although specific blocks are disclosed in process 630, such blocks are exemplary. That is, the embodiments in accordance with the invention are well suited to performing various other blocks or variations of the blocks recited in FIG. 6B.

At step 632 of process 630, a logical exclusive-OR (XOR) operation of the destination address and the Address register is performed. Each bit of the destination address and the Address register are compared. If the bits do not match, a '1' is returned. Alternatively, if the bits do match, a '0' is returned.

At step 634, a logical AND operation of the result of the XOR operation and the Do Not Care register is performed. Each bit of the result of the XOR operation and the Do Not Care register are compared. If either of the bits is '0', a '0' is returned. Alternatively, if neither of the bits is '0', a '1' is returned.

At step 636, it is determined whether the logical AND operation returns a value of zero (e.g., 00h or 0000 0000b). A value of zero indicates that the destination address matches the control information stored in the mask register. A match indicates that the destination address is acceptable for transmitting data through the I2C port.

FIG. 7B illustrates exemplary comparisons 720 and 730 of control information and destination addresses in accordance with embodiments of the invention. Both comparisons 720 and 730 are based on a mask register setting as indicated in mask register setting 710 of FIG. 7A, wherein allowed addresses are in the range of 20h-27h.

Comparison 720 illustrates an exemplary comparison where the destination address is 24h. As described at step 632 of FIG. 6B, a logical XOR operation is performed on the destination address (24h) and the Address register (20h), returning a result of 04h. A logical AND operation is then performed on the result of the XOR operation (04h) and the Do Not Care register (F8h), as described at step 634 of FIG. 6B. The logical AND operation results in 00h, indicating a destination address that permits transmission through the I2C port.

Comparison 730 illustrates an exemplary comparison where the destination address is 28h. A logical XOR operation performed on the destination address (28h) and the Address register (20h) returns a result of 08h. A logical AND operation performed on the result of the XOR operation (08h) and the Do Not Care register (F8h) returns a result of 08h. Because the result of the logical AND operation results in a value that is not 00h, the destination address is not permitted for transmission through the I2C port.

With reference to FIG. 6B, provided the logical AND operation returns a value of zero, as shown at step 638, transmission through the I2C port is permitted. Process 630 then proceeds to step 640 of process 600 of FIG. 6A. Alternatively, provided the logical AND operation returns a value other than zero, as shown at step 639, transmission through the I2C port is not permitted. Process 630 then proceeds to step 640 of process 600 of FIG. 6A.

At step 640 of FIG. 6A, it is determined whether transmission through the I2C port is permitted. In one embodiment, the determination is based on the results of comparing the destination address to the control information as described at process 630 of FIG. 6B. It should be appreciated that any comparison may be used to compare the destination address to the control information, and the invention is not limited to the embodiment described at process 630 of FIG. 6B. For example, if the mask register is one byte for storing one address, an XOR operation can be performed on the mask register and the destination address, where a result of 00h indicates an allowable destination address.

Provided transmission through the I2C port is permitted, as shown at step 650, the data is transmitted through the I2C port. Process 600 then proceeds to step 670. Alternatively, provided transmission through the I2C port is not permitted, as shown at step 660, the data is ignored by the I2C port.

At step 670, it is indicated in a PIT register of the I2C router that the destination address corresponds to the I2C port. In one embodiment, a '1' is indicated in the bit corresponding to the I2C port in the PIT register.

Accordingly, embodiments of the invention provide a process for securely controlling data communication at an I2C router. By using a mask register of an I2C port, it is possible to prevent unintended and/or unauthorized entities for accessing information communicated across a bus. Each port is assigned an address, and only information intended for a particular address can be transmitted through the port. Furthermore, it is not possible for a device to spoof the bus to deliberately receive unauthorized data due to the mask register.

Method of Transmitting Data Through an I2C Router

Referring again to FIG. 5, in overview, embodiments of the invention provides for a novel method of transmitting data through an I2C router 570 that avoids buffer-overflow. In one embodiment of the invention I2C router 570 comprises a first I2C source port buffer 522, an I2C destination port 550 coupled to the first I2C source buffer 522 via high speed internal bus 575, and a second I2C source port buffer (not shown but similar to buffers 521 and 522) also coupled to I2C destination port 550 via high speed internal bus 575. Each buffer in router 570 is associated with a port in the router 570 (e.g., first I2C source buffer 522 is associated with I2C port 560) and ports in the router are in communication with each other through an internal bus (e.g. high speed bus 575).

In one embodiment, data to be transmitted from the first I2C port 560 to the I2C destination 550 port is received at the first I2C port buffer 522. On receiving data in the first I2C source port buffer 522, the router 570 is operable to capture the I2C destination port 550 before the first I2C source port buffer 522 has overflowed. On capturing destination port 550, the router is operable to transmit data from the first I2C source port buffer 522 to the I2C destination port 550, while restricting transmission from other source port buffers (not shown) to destination port 550. Thus with the invention, router 570 is operable as a router/hub for transmitting data between ports; similarly, router 570 is operable as a multi bus hub for secure transmission between ports.

Figure 8A:
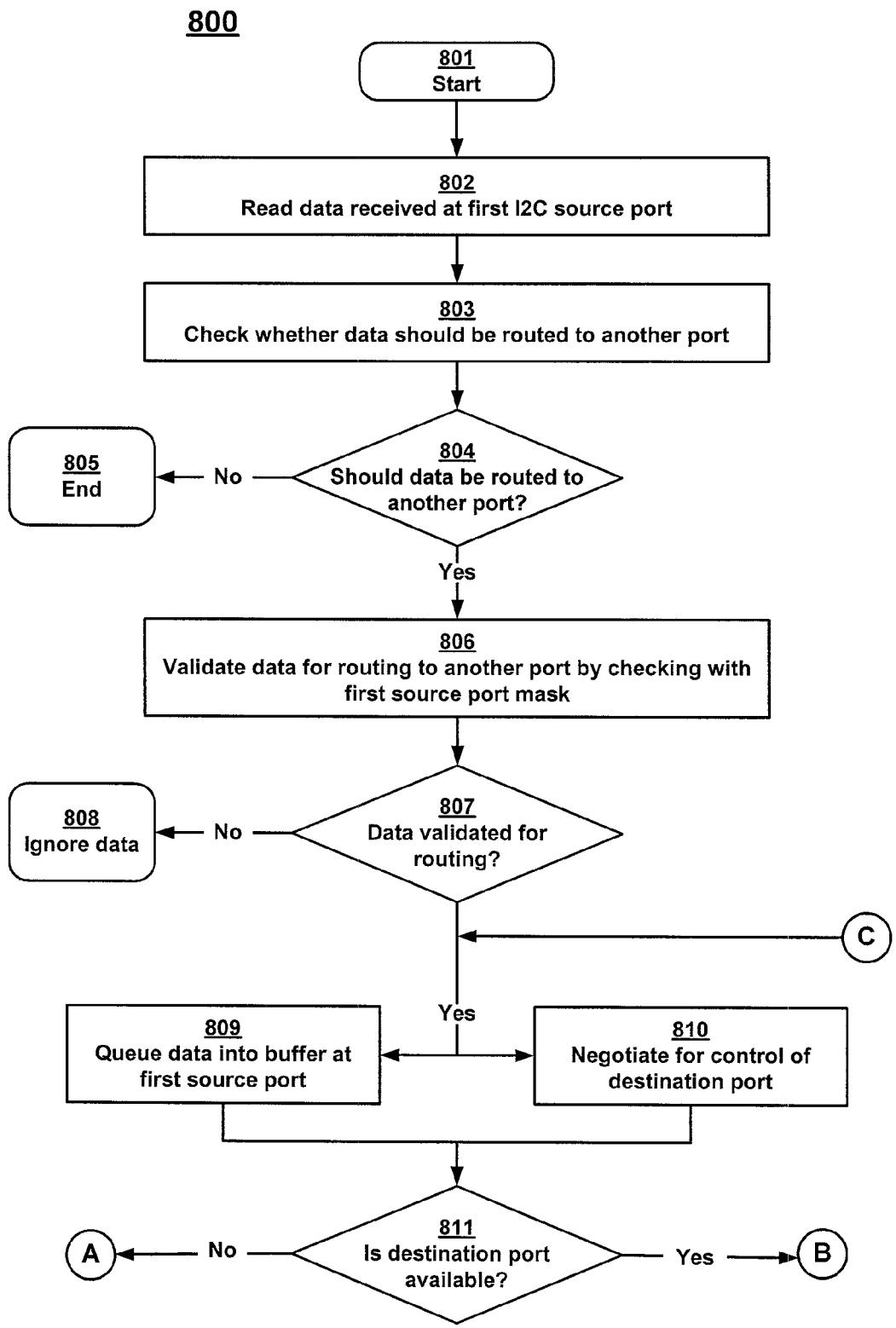
FIGS. 8A and 8B show a flow diagram of a method of transmitting data through an I2C router in accordance with an embodiment of the invention.
Figure 8B:
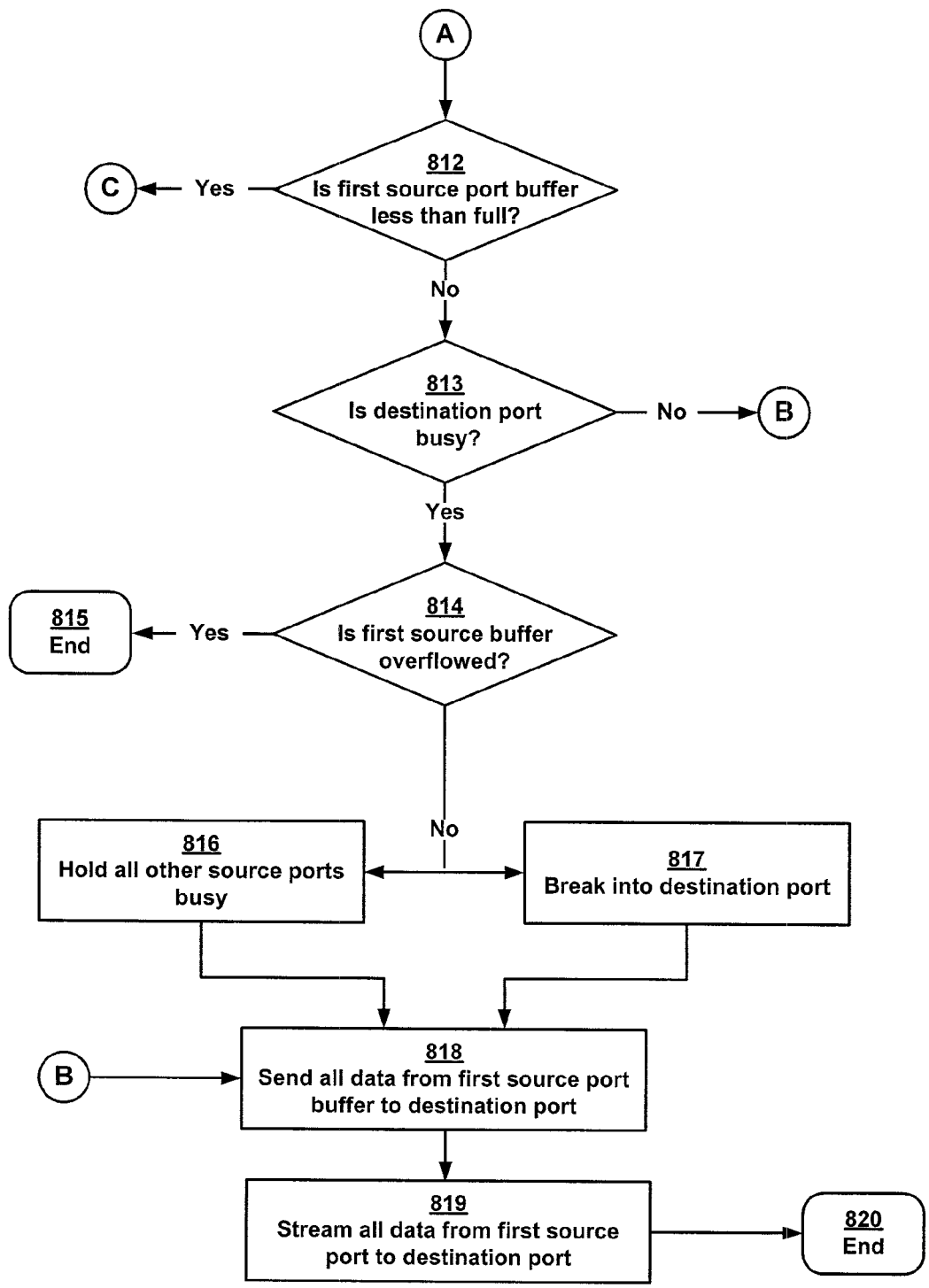
Figure 9:
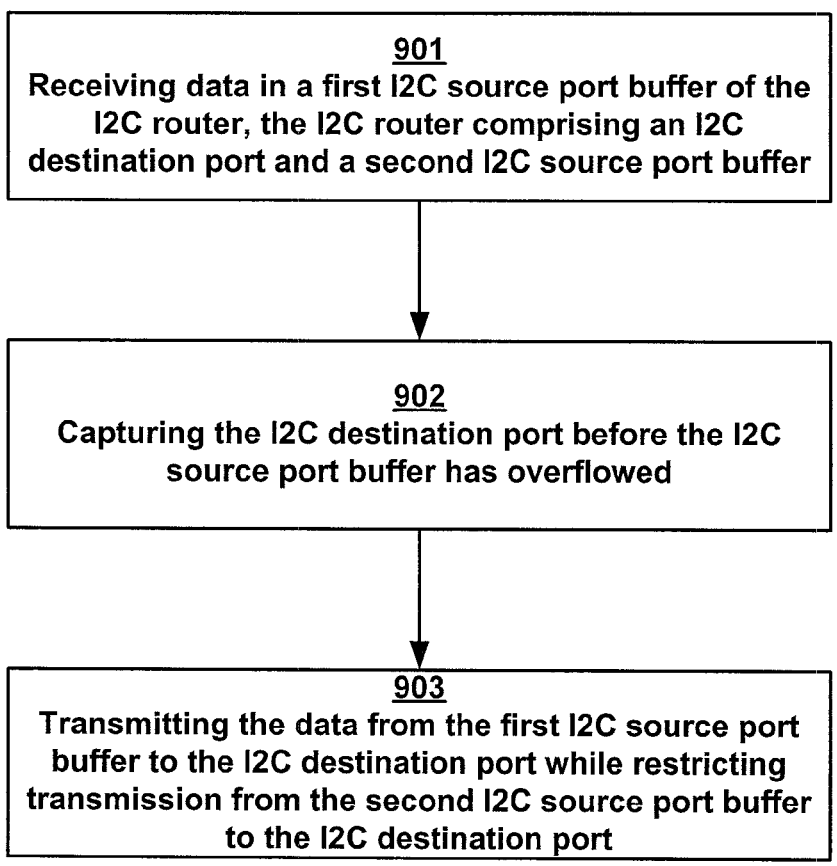
FIG. 9 shows a flow diagram of an alternative method of transmitting data though an I2C router in accordance with an embodiment of the invention.

For more detail description of this embodiment of the invention, FIG. 5 is now referenced in conjunction with flowchart 800 of FIGS. 8A and 8B and flowchart 900 of FIG. 9. Although specific steps of this embodiment of the invention are disclosed in flowcharts 800, 900, such steps are exemplary. That is, embodiments of the invention can be performed by various other steps or steps equivalent to those steps recited in flowcharts 800, 900. Also, steps in flowcharts 800, 900 may be performed in an order different than presented, and not all of the steps in flowcharts 800, 900 may be performed. All of, or a portion of, the method described by flowcharts 800, 900 may be implemented using computer-readable and computer-executable instructions which reside, for example, in computer-usable media of a computer system or like device. In one embodiment, the steps of flowcharts 800, 900 can be implemented by exemplary router 570 of FIG. 5.

Referring now to FIGS. 8A and 8B, a flow diagram 800 of a method of transmitting data through an inter-integrated circuit (I2C) router (e.g., router 570 of FIG. 5), in accordance with one embodiment of the invention, is shown. The method starts at step 801 when router 570 becomes aware that a source port (e.g. source port 560) has received new data representing the beginning of a I2C data packet from a transmitting device (not shown) connected to source port 560 through SDA 562 and SLC 572, for transmission to a destination port (e.g. destination port 550 on the router 570).

In step 802, the data packet is received and read at source port 560. In step 803, the data is checked to determine whether, or if, the packet should be routed to a port another than port 560. In an IC2 transmission, the first byte of a data packet contains the destination address of the packet. In checking whether the data packet should be routed to another port, router 570 looks at this byte to determine which, if any, destination ports is to receive the packet.

In step 804, if the packet is not to be routed to another port, the packet is ignored and the method ends at step 805. If in step 804 router 570 has determined that the packet should be routed to another port (e.g. to port 550), then in step 806 the data is validated by router 570 for routing to destination port 550 by comparing router mask 532 data with destination port 550 address.

In step 807 if the data is not validated by mask 532, the data is ignored in step 808. If, however, in step 807, the data is validated for routing to destination port 550, the router 570, in step 809, queues the data into buffer 522 of source port 560 until router 570 has received confirmation that destination port 550 is ready to receive incoming data from source port 560.

While the incoming data is being queued in buffer 522, in step 810, router 570 controls destination port 550 by using control lines (not shown) attached to port 550 and monitoring the necessary registers designated (not shown) for destination port 550.

In step 811, if it has been determined that destination port 550 I2C is currently available, then router 570 sends the data from source port buffer 522 to destination port 550 via high speed internal bus 575, where, at steps 818, 819 and 820, the data can be streamed with remaining data in buffer 522 to the destination port 550 via high speed bus 575.

If, however, in step 811 it is determined that the destination port 550 is currently busy, the data continues to be stored in source port buffer 522 as it is being received at the source port 560. In step 812 of FIG. 8B, router 570 checks source port buffer 522 by polling to determine whether a predetermined point (e.g., the halfway point) has been reached in source port buffer 522. Alternatively, the source port buffer initiates an interrupt to the router when the buffer has reached its predetermined point. In step 813, router 570 polls the destination port 550 register for availability, and also negotiates control of destination port 550. As long as source port buffer 522 capacity is still below the predetermined point, router 570 continues to queue data into source buffer 522 and continue to negotiate for control of destination port 550.

In step 814, if destination port 550 remains busy for a long time after data has been received at source port buffer 522, and the source port buffer 522 capacity has reached the predetermined point (e.g. the halfway point), router 570 takes one of the following two actions to capture destination port 550 before buffer 522 has overflowed:

a) In step 816, the router 570 holds other ports currently attempting to communicate with destination port 550 busy, and transmit data from first port buffer 522 until the data in source port buffer 522 has been transmitted to destination port 550. This is accomplished by the router 570 asserting logic low on all SDA and SCL lines other than destination port 550 SDA and SCL lines.

b) Alternatively, in step 817, router 570 breaks into destination port 550 by sending bytes of 0's to ports transmitting on high speed internal bus 575. Under the I2C protocol, when a transmitting port recognizes that it is receiving bytes of 0's data on its own port, it halts its initial transmission and attempt to resend the transmission. In accordance with the invention, it is in between the time of the halt and the resending of the initial data at ports other than source port 560 that router 570 breaks into and win negotiation of destination port 550. It should be noted that when router 570 initiates action to capture destination port 550, if the destination port 550 is not busy, the router 570 obtains control of destination port 550 and starts sending out data to destination port 550 (e.g., at a rate as fast as source port buffer 522 is being filled).

Router 570 continues with either of these two actions until it captures destination port 550 at steps 816, 817 or until source port buffer 522 has overflowed its capacity. Upon capturing destination port 550, the router 570, in steps 818, 819 and 820 transmits data from source port 560 to destination port 550 until the data at source port 560 intended for destination port 550 is transmitted. If router 570 fails to capture destination port 550 and source port buffer 522 overflows, the method terminates at step 815 with the consequent loss of data at source port 560.

In this embodiment of the invention, the likelihood that source port buffer 522 overflows is reduced by designing source buffer 522 to have a capacity of twice the size of a packet length, and by initiating capturing of the destination port 550 before the source port buffer 522 has overflowed, at step 814, when source port buffer 522 has reached a predetermined point (e.g., the half way point) of its capacity. Thus, for example if the packet length is 32 bytes and the capacity of source port buffer 522 is 64 bytes, the action to capture destination port 550 commences when source port buffer 522 is at 32 bytes. Under these conditions, source port buffer 522 should not overflow. It should be noted that other design ratios for packet length to buffer capacity can be used in this embodiment of the invention.

Referring now to FIG. 9, a flow diagram of an alternative method of transmitting data through an inter-integrated circuit (I2C) router, in accordance with an embodiment of the invention, is shown. The method of transmitting data through the I2C router 900 comprises, in step 901, receiving data in the first source port buffer 522 of router 570. In step 902, the router 570 is operable to capture destination port 550 before the first source port buffer 522 has overflowed. In step 903, the router 570 is operable to transmit data from first source port buffer 522 to the destination port 550 while restricting transmission from other source port buffers (not shown) to the destination port 550.

For ease of explanation, the above embodiments describe the invention in terms of communication between a first and second I2C port. However, it is appreciated that the method of buffering data can comprise communications between an I2C port and an external high speed port and between an I2C port and a plurality of I2C ports.

Method of Overflow Recovery of I2C Packets on an I2C Router

Referring again to FIG. 5, in overview, embodiments of the invention also provide for a novel method of transmitting data through an I2C router 570 wherein a source port buffer, e.g., buffer 522 has overflowed. In this embodiment of the invention router 570 comprises a first I2C source buffer 522, an I2C destination port 550 coupled to the first I2C source buffer 522 via high speed internal bus 575, and a second I2C source port buffer (not shown but similar to buffers 521 and 522) also coupled to I2C destination port 550 via high speed internal bus 575. Each buffer e.g. 521, 522 in router 570 is associated with a port e.g. 550, 560 in the router 570, e.g., first I2C source buffer 522 is associated with I2C port 560; and, ports in the router are in communication with each other through an internal bus, e.g. high speed bus 575.

In an embodiment wherein data at a source port has overflowed the buffer, e.g. the first I2C source port buffer 522 has overflowed, router 570 is operable to request resend of the overflowed data to first I2C source port buffer 522. On requesting the resending of the data to source buffer 522, router 570 is operable to hold other ports currently attempting to transmit to the destination port 550, or presently transmitting to the destination port 50, busy. Alternatively, the router 570 is operable to break into the I2C destination port 550. In either event, on succeeding in accessing the I2C destination port, the router is operable to resend the recovered data from the source port buffer 522 to the destination port 550 while restricting transmission from other source port buffers (not shown) to destination port 550. Thus with the invention, router 570 is operable as a router/hub for transmitting data between ports; similarly, router 570 is operable as a multi bus hub for secure transmission between ports.

Figure 10A:
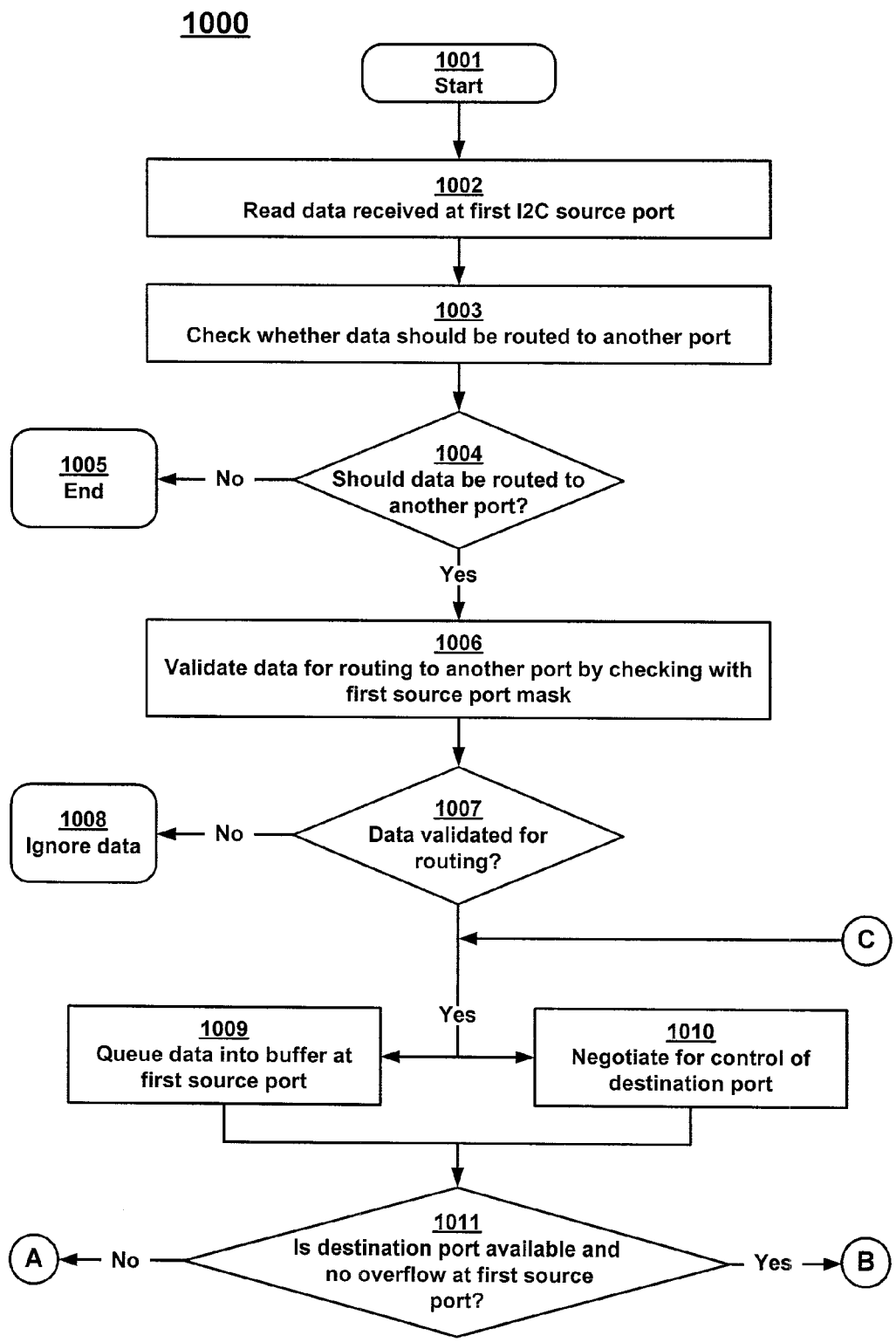
FIGS. 10A and 10B show a flow diagram of a method of transmitting data through an I2C router in accordance with an embodiment of the invention.
Figure 10B:
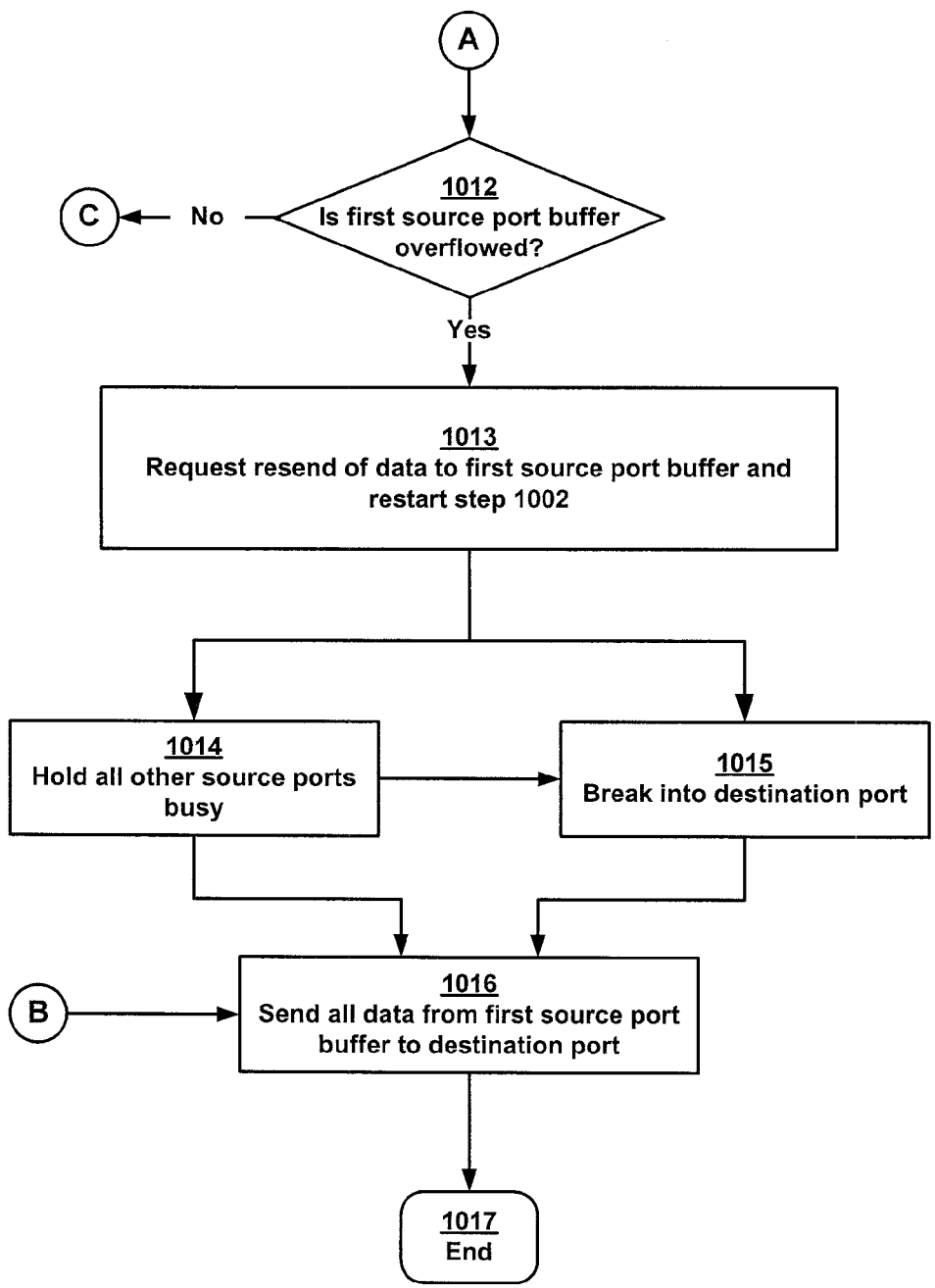
Figure 11:
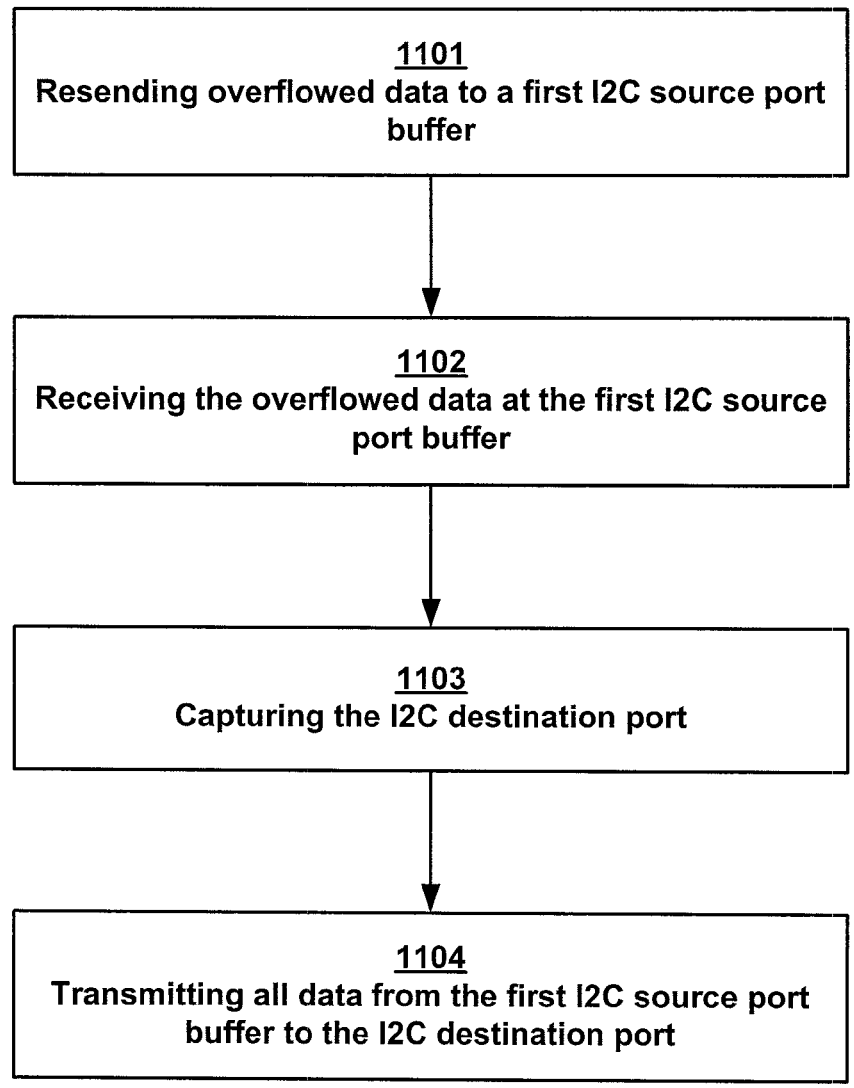
FIG. 11 shows is a flow diagram of an alternative method of transmitting data through an I2C router in accordance with an embodiment of the invention.

FIG. 5 is now referenced in conjunction with flowchart 1000 of FIGS. 10A and 10B and flowchart 1100 of FIG. 11 to describe in more detail this embodiment of the invention. Although specific steps of this embodiment of the invention are disclosed in the flowcharts 1000, 1100, such steps are exemplary. That is, embodiments of the invention can be performed by various other steps or steps equivalent to those steps recited in flowchart 1000, 1100. Also, steps in flowchart 1000, 1100 may be performed in an order different than presented, and not all of the steps in flowchart 1000, 1100 may be performed. All of, or a portion of, the method described by flowchart 1000, 1100 may be implemented using computer-readable and computer-executable instructions which reside, for example, in computer-usable media of a computer system or like device. In one embodiment, the steps of flowcharts 1000, 1100 can be implemented by exemplary router 570 of FIGS. 3 and 5.

Referring now to FIGS. 10A and 10B, a flow diagram 1000 of a method of transmitting data through an inter-integrated circuit (I2C) router 570, in accordance with an embodiment of the invention, is shown. The method starts at step 1001 when the router 570 receives information that a source port (e.g. source port 560) has received new data representing the beginning of a packet from a transmitting device on the source port 560, for transmission to a destination port, (e.g., destination port 550).

In step 1002, the data is read and in step 1003, the data is checked to determine whether, or if, the packet should be routed to another port. In an IC2 transmission, the first byte of a packet contains the destination address of the packet. In checking whether the data should be routed, the router 570 looks at this byte to determine which, if any, destination ports, e.g. port 550 is to receive the packet.

In step 1004, if the packet is not to be routed, the packet is ignored and the method ends at step 1005. If in step 1004 the router 570 has determined that the packet should be routed, then in step 1006 the data is validated for transmission to the destination port 550 by comparing the router masking data 532 with the destination port address.

In step 1007 if the data is not validated by the mask 532, the data is ignored in step 1008. If, however, in step 1007, the data is validated for routing to a destination port 550, the router 570, in step 1009, queues the data into the buffer 522 at source port 560 until the router 570 has received confirmation that the destination port 550 is ready to receive incoming data from the source port 560.

While the data is being queued in the buffer 522, in step 1010, the router 570 controls the destination port 550 by using control lines attached to the port (not shown) and monitoring the necessary registers designated for the destination port 550.

In step 1011, if it has been determined that the destination port 550 is currently available and that buffer 522 has not overflowed, the router 570 sends the data from the source port buffer 522 to the destination port 550, where, at steps 1016, 1017 and 418, the data is streamed with remaining data in the buffer 522 to the destination port 550.

If, in step 1011 and then in step 1012 of FIG. 10B it is determined that the destination port 550 is currently busy but the buffer 522 has not overflowed, the data continues to be stored in the buffer 522 as it is being received, and the router 570 continues to negotiate control of the destination port 550.

If in step 1012 it is determined that the buffer 522 has overflowed, the router 570, in step 1013 requests a resend of data from the source port I2C bus and re-start step 1002 for this data. In step 1013, the router 570 takes one of the following two actions to capture the destination port 550:

a) In step 1014, the router 570 holds ports currently attempting to communicate with the destination port 550 busy until the initial data in the buffer 522 has been transmitted to the destination port 550. This is accomplished by the router 570 asserting logic low on all SDA and SCL lines other than the destination port 550.

b) Alternatively, in step 1015, the router 570 breaks into the destination port 550 by sending bytes of 0's to the transmitting ports. Under the I2C protocol, when a transmitting port recognizes that it is receiving bytes of 0's data on its own port, it halts its initial transmission and attempt to resend the transmission. It is in between the time of the halt and the resending of the initial data that the router 570 breaks into and win negotiation of the destination port 550. It should be noted that when the router 570 initiates action to capture the destination port 550, if the destination port 550 is not busy, the router 570 controls the destination port 550 and start sending out data at a rate as fast as the buffer 522 is being filled.

The router 570 continues with either of these two actions until it captures the destination port 550 at which point in step 1016, the router 570 feeds data from the source port 560 to the destination port 550 until the data is transmitted at step 1017. As data is being fed to the destination port 550, the router 570 keeps other ports busy with stretched low on the SCL and SDA lines until transmission of the packets completes successfully. Thereafter, the router 570 returns to normal operation.

Referring now to FIG. 11, a flow diagram 1100 an alternative method of transmitting data through an inter-integrated circuit (I2C) router, in accordance with an embodiment of the invention, is shown. At step 1101, overflowed data is resent to a first I2C source port buffer, the I2C router further comprising and a I2C destination port and a second I2C source port buffer. At step 1102, the overflowed data is received at the first I2C source port buffer. At step 1103, the I2C destination port is captured. At step 1104, data from the first I2C source port buffer is transmitted to the I2C destination port.

With the invention, a router is capable of functioning at speeds in the MHz range and the transmission from the source port to the destination port can be transparent under open, non-busy conditions. Further, with the invention, if a buffer overflows the data can be recovered for re-transmission to the destination port. Also, with the invention, since the router can track transmitted data and negotiate for a bus, the router can be operated as a multi-bus data hub with secure transmission to each port by limiting access to designated ports.

For ease of explanation, the above embodiments describe the invention in terms of communication between a first and second I2C port. However, it is appreciated that the method of overflow recovery of I2C packets can comprise communications between an I2C port and an external high speed port and between an I2C port and a plurality of I2C ports.

An Inter-Integrated Circuit Router Error Management System and Method

Figure 12:
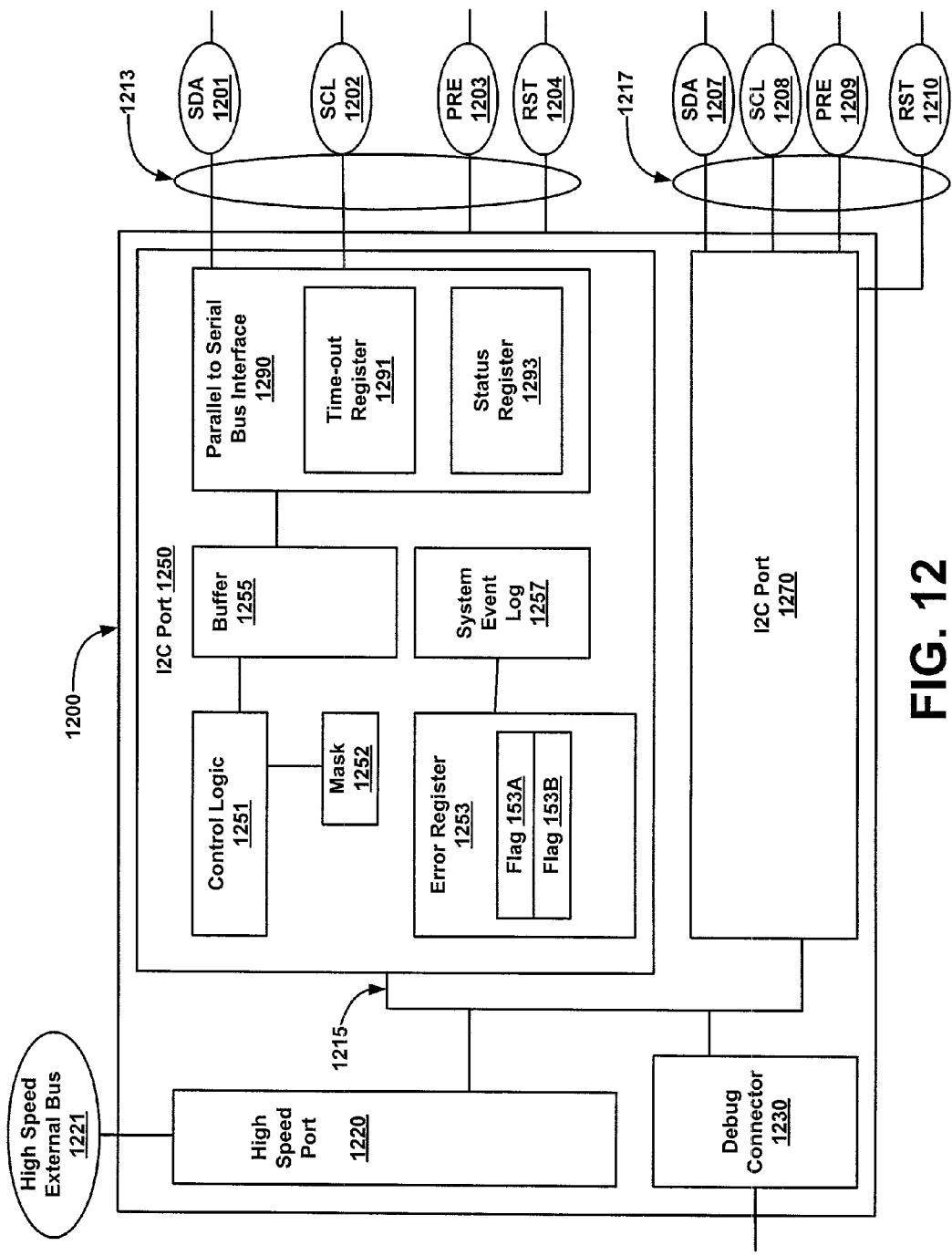
FIG. 12 is block diagram of an inter-integrated circuit (I2C) router error management system in accordance with one embodiment of the present invention.

FIG. 12 is block diagram of inter-integrated circuit (I2C) router error management system 1200 in accordance with one embodiment of the present invention. I2C router error management system 1200 comprises internal bus 1215, high speed port 1220, debug connector 1230 and I2C ports 1250 and 1270. Internal bus 1215 communicatively couples high speed port 1220, debug connector 1230 and I2C ports 1250 and 1270 (e.g., similar to other internal buses of the present invention 281, 375, 1810, etc.). High speed external port 1220 provides a high speed interface from internal bus 1215 and high speed external bus 1221 (e.g., similar to high speed external ports 210, 310, 1815, etc.). Debug connector 1230 provides an interface from the components of I2C router system 1200 to an external debugging mechanism. I2C ports 1250 and 1270 provides an interface between external I2C buses 1213 and 1217 respectively.

I2C ports 1250 and 1270 are similar to other I2C ports described herein (e.g., 253a, 550, 1625, etc.) and also include error management features. For example, I2C port 1250 comprises control logic 1251, mask 1252, buffer 1255, parallel to serial bus interface 1290, error register 1253 and system event log 1257. Control logic 1251 controls information flow through I2C port 1250 (e.g., similar to control logic 257a, 517, 1640, etc.). Mask 1252 provides control information to control logic 1251 (e.g., in accordance with method 600 and/or settings shown in FIGS. 7A and 7B, etc.). Buffer 1255 buffers information communicated via I2C port 1250. In one exemplary implementation, buffer 1255 can buffer information in accordance with method 800, 900, 1000 or 1100. Parallel to serial bus interface 1290 provides an interface between internal parallel communications of I2C port 1250 and external serial I2C bus communications. Error register 1253 tracks (e.g., stores) indications of errors (e.g., associated with a data flow of information through I2C port 1250 and controlled control logic 1251). Event system log 1257 logs error information and statistics in a coordinated and correlated manner.

I2C ports 1250 and 1270 provide an interface to communicate I2C signals on bus 1213 and 1217 respectively to internal bus 1215 and vise versa. Present invention I2C bus 1213 includes SDA line 1201, SCL line 1202, presence detect line 1203 and reset line 1204. Present invention I2C bus 1217 includes SDA line 1207, SCL line 1208, presence detect line 1209 and reset line 1210. Presence detect lines 1203 and 1209 indicate the presence of a component communicatively coupled to bus 1213 and 1217 respectively (e.g., similar to lines 1660 and 1665). Reset lines 1204 and 1210 are utilized to communicate reset indications to components communicatively coupled to busses 1213 and 1217 respectively.

With continued reference to FIG. 12, error register 1253 can capture error information in communication operations in a variety of different ways. Error register 1253 can utilize flags 153A and 153B to capture indications of an error (e.g., particular bits included in error register 1253 are set to a predetermined logical value to indicate the existence of a type of error). Error register 1253 can include a failed port register or flag that is set if an I2C port fails. The register can also start a secondary state machine that executes a process to regain control of a failed port and monitor the port for recovery. The secondary state machine can be included in I2C router system 1200 (e.g., included in parallel to serial bus interface 1290) or can be independent of the I2C router system 1200. Remaining non-err ports of I2C router system 1200 continue to pass data properly with no effect from the failed port or the secondary state machine. If a non-err I2C router system 1200 port attempts to communicate with an "isolated" failed port, a transmitting port is signaled that at least a portion of the communication is not completed. In one exemplary implementation, error register 1253 maintains an error count. For example, error register 1253 can track error counts by incrementing a value included in an error register flag each time an error event associated with the flag is detected.

Error register 1253 is flexibly adaptable for implementation with a variety of error management policies directed to capturing indications of and recovering from numerous different errors. In one embodiment, error register 1253 can capture an indication of a failed port condition and participate in recovery from the error. For example, a failed port condition can be recognized by an indication of the number of times that parallel to serial bus interface 1290 attempts to reset its own ports in order to gain control of SCL line 1202 and SDA line 1201. Alternatively, a failed port condition can be recognized by an indication of the number of times that I2C router system 1200 attempts and fails to take control of an I2C port suspected of failing. An error register 1253 can also be utilized to capture and recover from a buffer problem (e.g., a buffer overflow). For example, an error register can be utilized to detect long transmission packets that exceed the buffering capabilities of buffer 1255. Present invention error management policies can also be directed to minimizing the likelihood of detrimental bus monopolization by a particular I2C port.

I2C router system 1200 also includes error recovery mechanisms and features to facilitate recovery from an error condition. In one embodiment, when an I2C port is considered "lost" (e.g., a fatal error or errors have occurred on the I2C port), I2C router system can prevent data from passing to or from the lost I2C port. A failed I2C port is isolated from the data transfer portion of I2C router system 1200 (e.g., internal bus 1215). In one exemplary implementation, I2C router system 1200 includes a fault light which is activated to indicate an I2C router is not functioning properly (e.g., is "lost").

With reference still to FIG. 12, parallel to serial bus interface 1290 can be utilized to provide an indication of errors to error register 1253. In one exemplary implementation, time out register 1291 can be utilized to provide indications of errors. A maximum time out value is set in time out register 1291. The maximum time out value is the maximum time that an SCL line (e.g., SCL 1202) is held low before a reset is initiated (e.g., via reset line 1204). The SCL can be held low for a variety of reasons, including long negotiations, missing stop bit, and/or hung bus. The time out feature starts when the SCL goes low and is reset when the SCL line goes high. If the SCL line stays low for a time period equal to or longer that the time out value I2C router system 1200 concludes a bus error has occurred. Parallel to serial bus interface 1290 loads an indication or status code in status register 1293 that the SCL line is stuck low and generates an interrupt signal that attempts to release SCL line 1202 and SDA line 1201. Control logic 1251 can poll the status register 1293 and monitor the interrupt signal line to determine the error event occurred. Control logic 1252 can respond by incrementing an I2C bus error counter value by 1 and setting a port error LED to distinguish the failed port from a non-failed port.

Other I2C "health" indicators or error counters can be implemented utilizing other functions in parallel serial bus interface 1290. In one exemplary implementation, when a missing stop bit occurs parallel to serial bus interface 1290 can load a status code that indicates a bus error occurrence during serial transfer. A bus error can be caused by the occurrence of start or stop condition at an incorrect ("illegal") position in a format frame or an external interface interferes with parallel to serial bus interface. For example, a data bit or acknowledge bit is transmitted in an address byte. When an error occurs an interrupt is set (e.g., including setting a serial interrupt flag). Control logic 1251 can again poll the status register 1293 and increment a missing stop bit error count by 1 if a missing stop bit error occurred.

Figure 13:
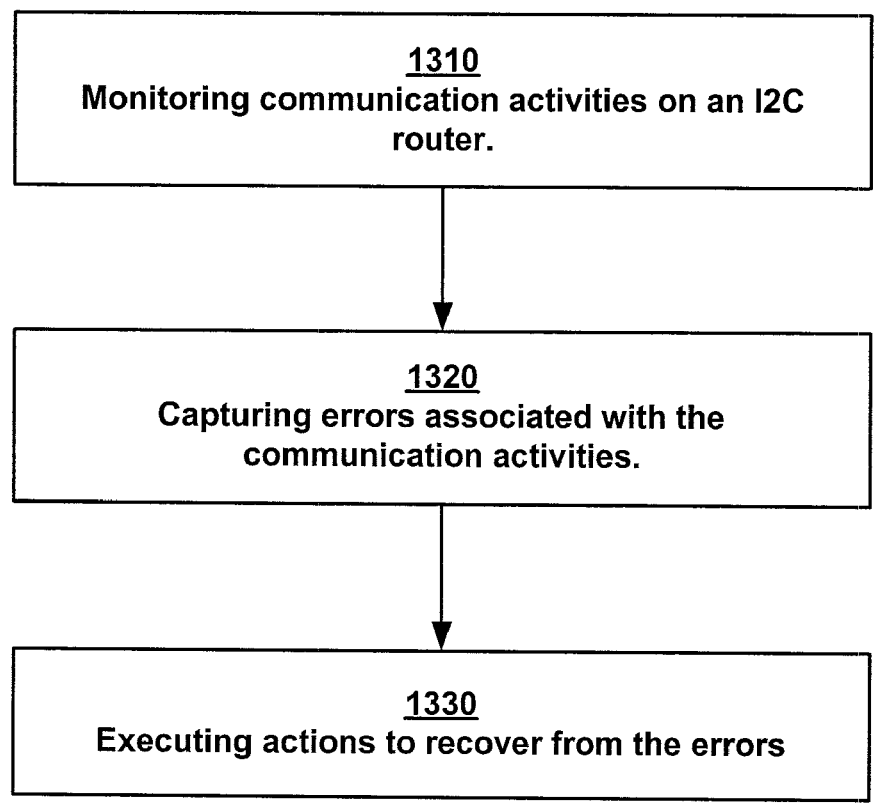
FIG. 13 is a flow chart of an inter-connected router error management method in accordance with one embodiment of the present invention.

FIG. 13 is a flow chart of inter-integrated connected (I2C) router error management method 1300, an inter-connected router error management method in accordance with one embodiment of the present invention. I2C router error management method 1300 tracks, tabulates and recovers from error issues. Inter-integrated connected (I2C) router error management method increases the robustness and dependability of an I2C router system.

In step 1310, communication activities on an I2C router are monitored. For example, the communications traffic flow characteristics of a port are examined. The amount of time an I2C port captures an internal bus can be examined or the amount of information communicated by an I2C port in one packet can be examined. In one exemplary implementation, buffer (e.g., buffer 1255) overflows are monitored.

Errors associated with the communications activities are captured in step 1320. In one embodiment, errors identified in step 1310 are tracked. For example, a count of the particular types of error occurrences is maintained. In one exemplary implementation, error indications are logged in coordinated and correlated manner. Indications of errors can be communicated to a debugging system for extended debugging analysis.

In step 1330 actions are executed to recover from the errors. In one embodiment of the present invention, the recovery action includes pausing the I2C communication activity associated with an error. For example, pausing communication of a long transmission packet via an affected port until the large packet can be sent directly to its destination port with the use of a buffer. In one exemplary implementation, the communication is paused until an internal I2C router bus can be captured by the source port of the long packet. Alternatively large packets are not allowed to be communicated via a source port and a source port attempting to communicate a large packet is disabled. Disabling a source port can also be utilized to prevent a run away process and/or denial of service attacks from preventing other ports from accessing an internal bus (e.g., 1215) and effectively bringing down the ports. In one embodiment of the present invention, an error recovery action includes initiating a reset (e.g., resetting a device coupled to an I2C port). The present invention is also flexibly adaptable to reset multiple I2C ports and facilitate implementation an overall I2C communication network error monitoring and recovery system.

Figure 14:
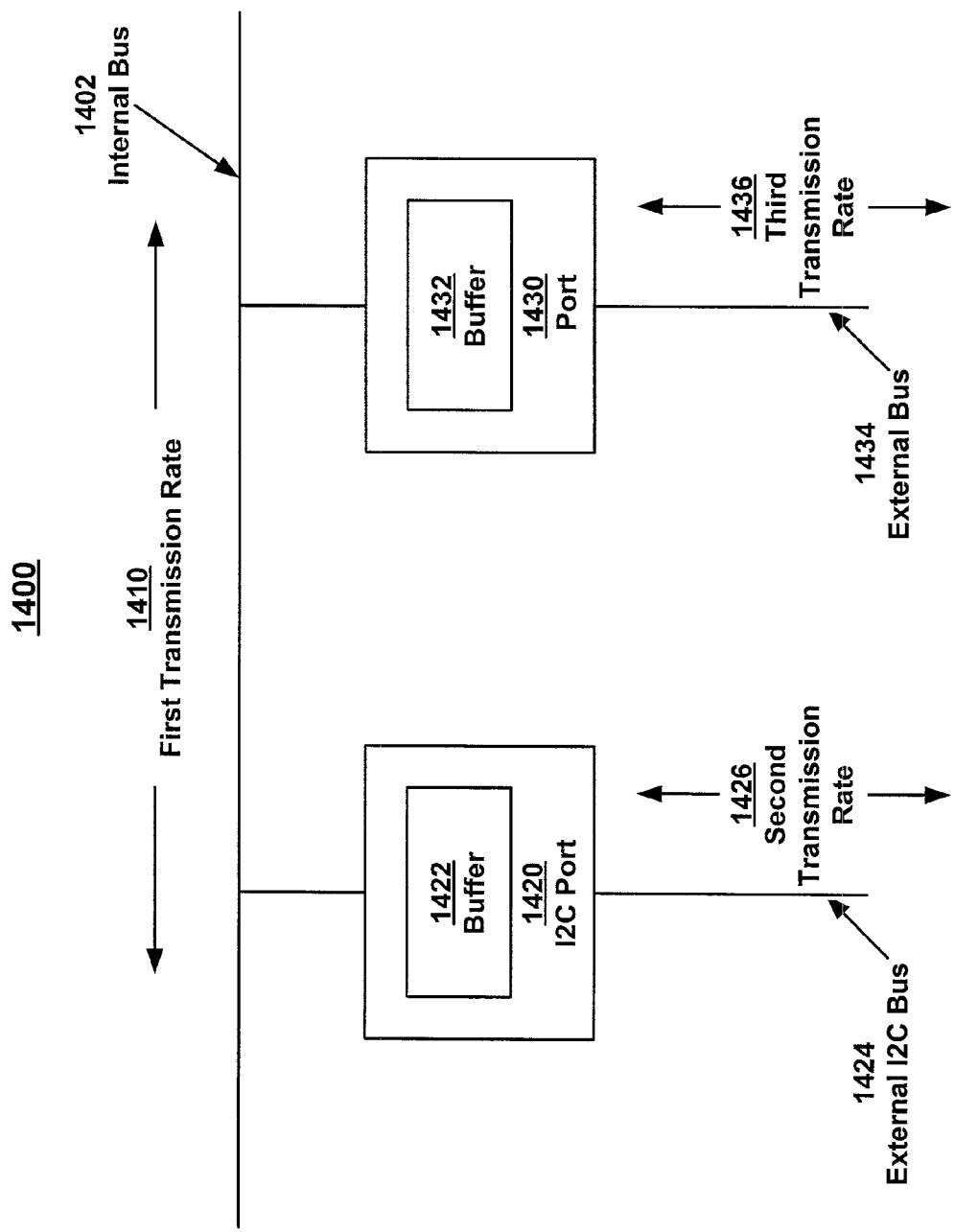
FIG. 14 shows a data flow diagram of an exemplary inter-integrated circuit router for supporting independent transmission rates in accordance with an embodiment of the invention.

An Inter-Integrated Circuit Router for Supporting Independent Transmission Rates Referring now to FIG. 14, a data flow diagram of an inter-integrated circuit (I2C) router for supporting independent transmission rates, in accordance with an embodiment of the invention, is shown. For purposes of clarity in describing the present embodiment, I2C router 1400 is used to illustrate an I2C router capable of supporting coupled devices having independent transmission rates. However, it should be appreciated that other embodiments of invention, such as those described in I2C router 570 of FIG. 5, also are be operable to provide independent transmission rates for coupled devices, and that support of independent transmission rates is not exclusive to the embodiment described in FIG. 14.

I2C router 1400 comprises internal bus 1402 operable to transmit data at a first transmission rate 1410. In one embodiment, internal bus 1402 is a high-speed bus. In one embodiment, first transmission rate 1410 is substantially 1.4 megahertz (MHz). Internal bus 1402 comprises ports configured for coupling to electrically isolated external buses. An electrically isolated bus (e.g., external I2C bus 1424 and external bus 1434) can run independently of other buses the electrically isolated port is coupled to through the port.

I2C router 1400 comprises I2C port 1420 coupled to internal bus 1402. I2C port 1420 comprises a buffer 1422 and is coupled to external I2C bus 1424. External I2C bus 1424 is electrically isolated from internal bus 1402. External I2C bus 1424 is operable to transmit data at second transmission rate 1426. In one embodiment, second transmission rate 1426 is substantially 100 kilohertz (kHz). In another embodiment, second transmission rate 1426 is substantially 400 kHz. External I2C bus 1424 is configured for coupling to external devices or components (e.g., FRUs 220, 221 and 222 of FIG. 2).

Buffer 1422 is operable to buffer data transmitted between internal bus 1410 and external I2C bus 1424 when first transmission rate 1410 is different than second transmission rate 1426. Buffer 1422 comprises a data cache for temporarily storing data as it is transmitted between internal bus 1410 and external I2C bus 1424. In one embodiment, provided first transmission rate 1410 is greater than second transmission rate 1424, buffer 1422 is operable to receive data from internal bus 1402 at first transmission rate 1410, buffer the data by storing the data it is unable to transmit due to the disparity in transmission rates, and transmit data across external I2C bus 1424 at second transmission rate 1426. In effect, buffer 1422 is operable to slow down data transmission such that a slower link can receive data from a faster link. As described above, the size buffer 1422 can be configured in accordance with a variety I2C router 1400 implementations. For example, if I2C router 1400 is used in a configuration utilizing IPMI protocol, the cache can be sized as multiples of a packet size of 32 bytes (e.g., 64 bytes, 96 bytes, etc.).

In one embodiment, provided first transmission rate 1410 is greater than second transmission rate 1424, buffer 1422 is operable to cache data from external I2C bus 1424 at second transmission rate 1426 and transmit data in bursts across internal bus 1402 at first transmission rate 1410. For example, data is received at I2C port 1420 from external bus 1424. Buffer 1422 caches the data. Once enough data has been cached, the cached data is transmitted in bursts across internal bus 1402. Effectively, buffer 1422 operates to achieve higher throughput by receiving data from a slower link, caching the data, and pumping the data out the faster link at a faster rate. By bursting the data, faster bus 1410 can be freed to burst other data independent of bus 1424.

In one embodiment, I2C router 1400 comprises port 1430 coupled to internal bus 1402. Port 1430 comprises buffer 1432 and is coupled to external bus 1434. External bus 1434 is electrically isolated from internal bus 1402. External bus 1434 is operable to transmit data at third transmission rate 1436. It should be appreciated that buffer 1432 operates in a manner similar to buffer 1422, and is operable to buffer data when first transmission rate 1410 is different than third transmission rate 1436.

In one embodiment, port 1430 is a second I2C port (e.g., port 560 of FIG. 5) and external bus 1434 is an I2C bus (e.g., I2C bus 542 of FIG. 5). In another embodiment, port 1430 is a high-speed port (e.g., high-speed port 510 of FIG. 5) and external bus 1434 is an external high-speed bus (e.g., high-speed external bus 540 of FIG. 5).

In one embodiment, first transmission rate 1410 is at least as fast as the faster of second transmission rate 1426 and third transmission rate 1436. In one embodiment, internal bus 1402 is operable to transmit data at transmission rates less than first transmission rate. In the present embodiment, it is not necessary to cache data received at port 1420 from external I2C bus 1424 and transmit the data in bursts at first transmission rate 1410. Port 1420 can be operable to transmit data across internal bus 1410 at second transmission rate. Buffer 1432 is operable to receive data from internal bus 1402 at second transmission rate 1426 and transmit data from port 1430 to external bus 1434 at third transmission rate 1436.

In another embodiment, buffer 1422 is operable cache data received from external I2C port 1424 at second transmission rate 1426 and transmit the data in bursts across internal bus 1402 at first transmission rate 1410. Buffer 1432 is operable to receive the data from internal bus 1402 at first transmission rate 1410 and transmit the data to external bus 1434 at third transmission rate 1436. Buffer 1432 is operable to cache data received from external bus 1434 at third transmission rate 1436 and transmit the data in bursts across internal bus 1402 at first transmission rate 1410.

Figure 15A:
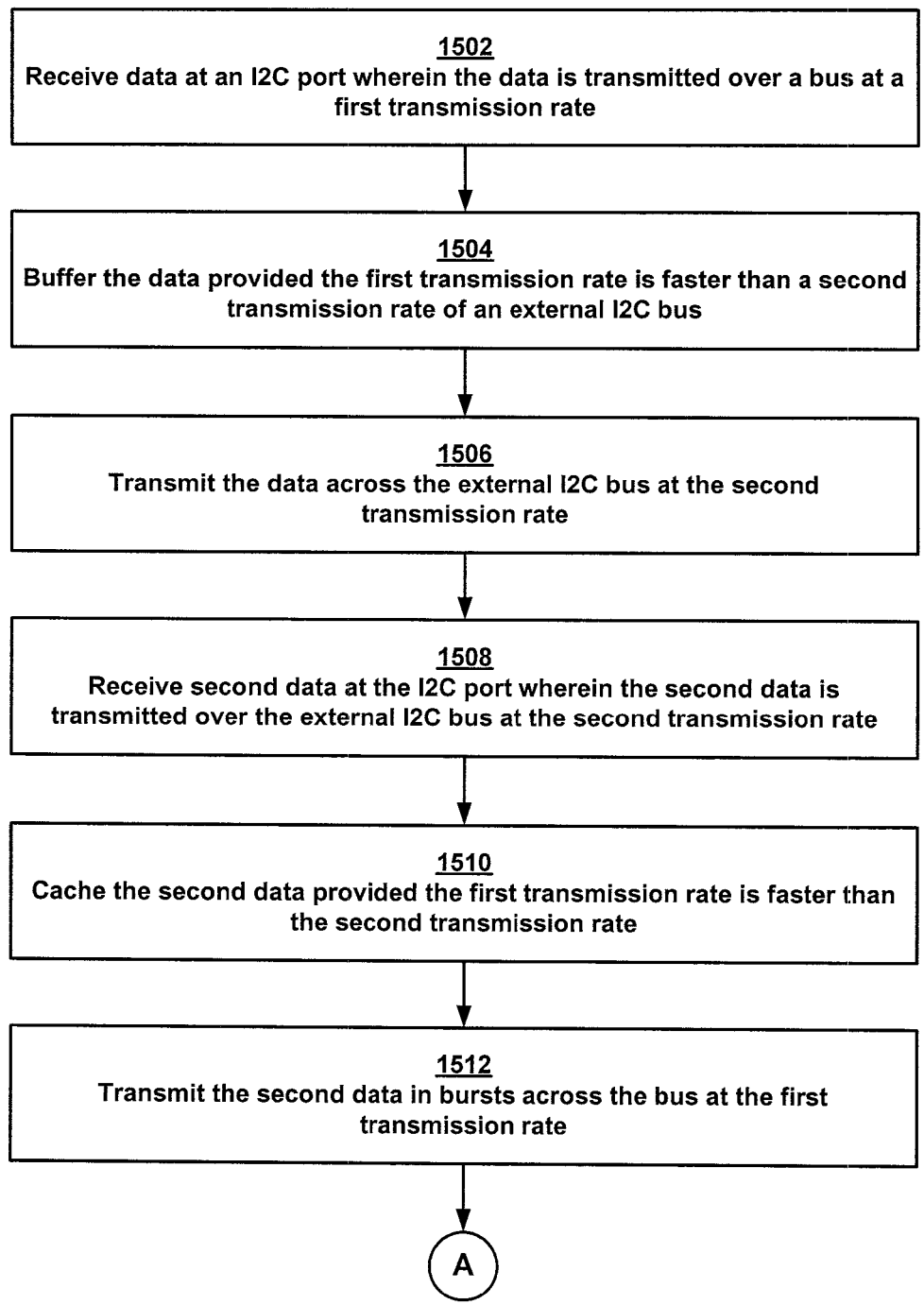
FIGS. 15A-C show flow diagrams illustrating processes for communicating data between ports of an inter-integrated circuit router in accordance with embodiments of the invention.
Figure 15B:
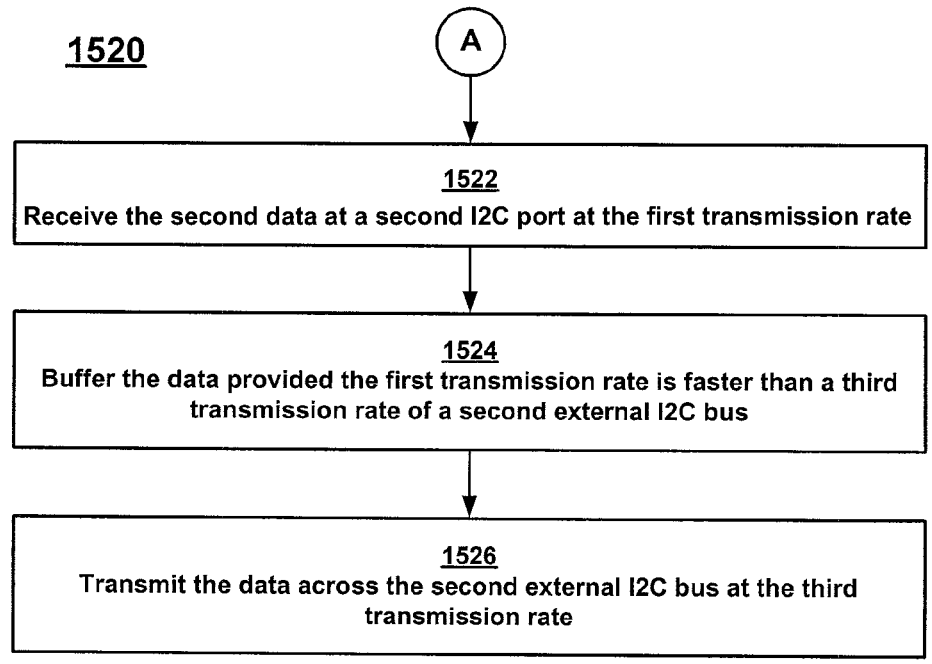
Figure 15C:
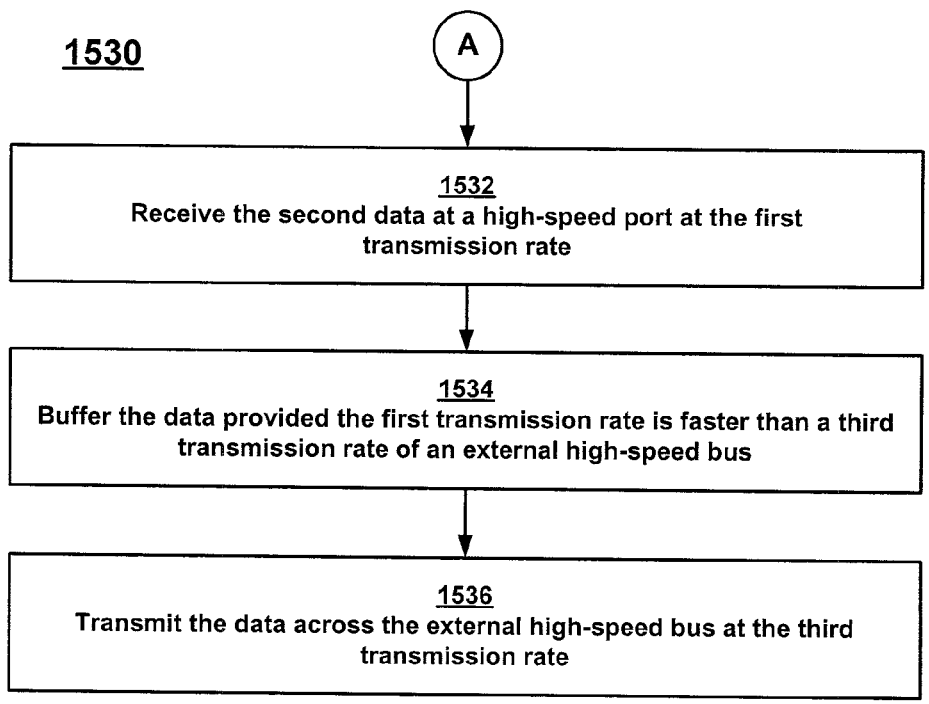

Referring now to FIGS. 15A-C, flow diagrams illustrating processes 1500, 1520 and 1530 for communicating data between ports of an inter-integrated circuit (I2C) router, in accordance with embodiments of the invention, are shown. In one embodiment in accordance with the invention, processes 1500, 1520 and 1530 are performed at an I2C router (e.g., I2C router 1400 of FIG. 4). Although specific blocks are disclosed in process 1500, such blocks are exemplary. That is, the embodiments in accordance with the invention are well suited to performing various other blocks or variations of the blocks recited in FIG. 15A. For purposes of clarity, processes 1500, 1520 and 1530 will be described in conjunction with I2C router 1400 of FIG. 14. However, it should be appreciated that the described embodiments of the present invention may be implemented on other I2C routers (e.g., I2C router 570 of FIG. 5).

At step 1502 of process 1500, data is received at I2C port 1420 over a bus (e.g., internal bus 1402) at first transmission rate 1410. At step 1504, provided first transmission rate 1410 is faster than second transmission rate 1426 of external I2C bus 1424 coupled to I2C port 1420, the data is buffered at buffer 1422. At step 1506, the data is transmitted across external I2C bus 1424 at second transmission rate 1426.

At step 1508, second data is received at I2C port 1420 over external I2C bus 1424 at second transmission rate 1426. At step 1510, provided first transmission rate 1410 is faster than second transmission rate 1426, the data is cached at buffer 1422. At step 1512, the data is transmitted in bursts across internal bus 1402 at first transmission rate 1410.

With reference to FIG. 15B, process 1520 for buffering second data at a second I2C port is described in accordance with an embodiment of the invention. In the present embodiment, port 1430 is a second I2C port and external bus 1434 is a second external I2C bus.

At step 1522 of process 1520, the second data is received at the second I2C port over internal bus 1402 at first transmission rate 1410. At step 1524, provided first transmission rate 1410 is faster than third transmission rate 1436 of the second external I2C bus, the second data is buffered at buffer 1432. At step 1526, the second data is transmitted across the second external I2C bus at third transmission rate 1436.

With reference to FIG. 15C, process 1530 for buffering second data at a high-speed port is described in accordance with an embodiment of the invention. In the present embodiment, port 1430 is a high-speed port and external bus 1434 is an external high-speed bus.

At step 1532 of process 1530, the second data is received at the high-speed port over internal bus 1402 at first transmission rate 1410. At step 1534, provided first transmission rate 1410 is faster than third transmission rate 1436 of the external high-speed bus, the second data is buffered at buffer 1432. At step 1536, the second data is transmitted across the external high-speed bus at third transmission rate 1436.

Accordingly, various embodiments of the present invention provide an I2C router for supporting independent transmission rates. The I2C router can comprise a high-speed internal bus coupled to a plurality of I2C ports and a high-speed port. Each bus coupled the I2C ports and the high-speed port is electrically isolated, and can operate at different speeds. By buffering data at each of the I2C ports, as well as caching the data and pumping it out at fast speeds, a single high-speed bus can be used in the I2C router to provide greater throughput. Furthermore, by having one high-speed port and a plurality of I2C ports, cost can be optimized for use without compromising performance.

System and Method for Presence Detect and Reset of Devices

Figure 16:
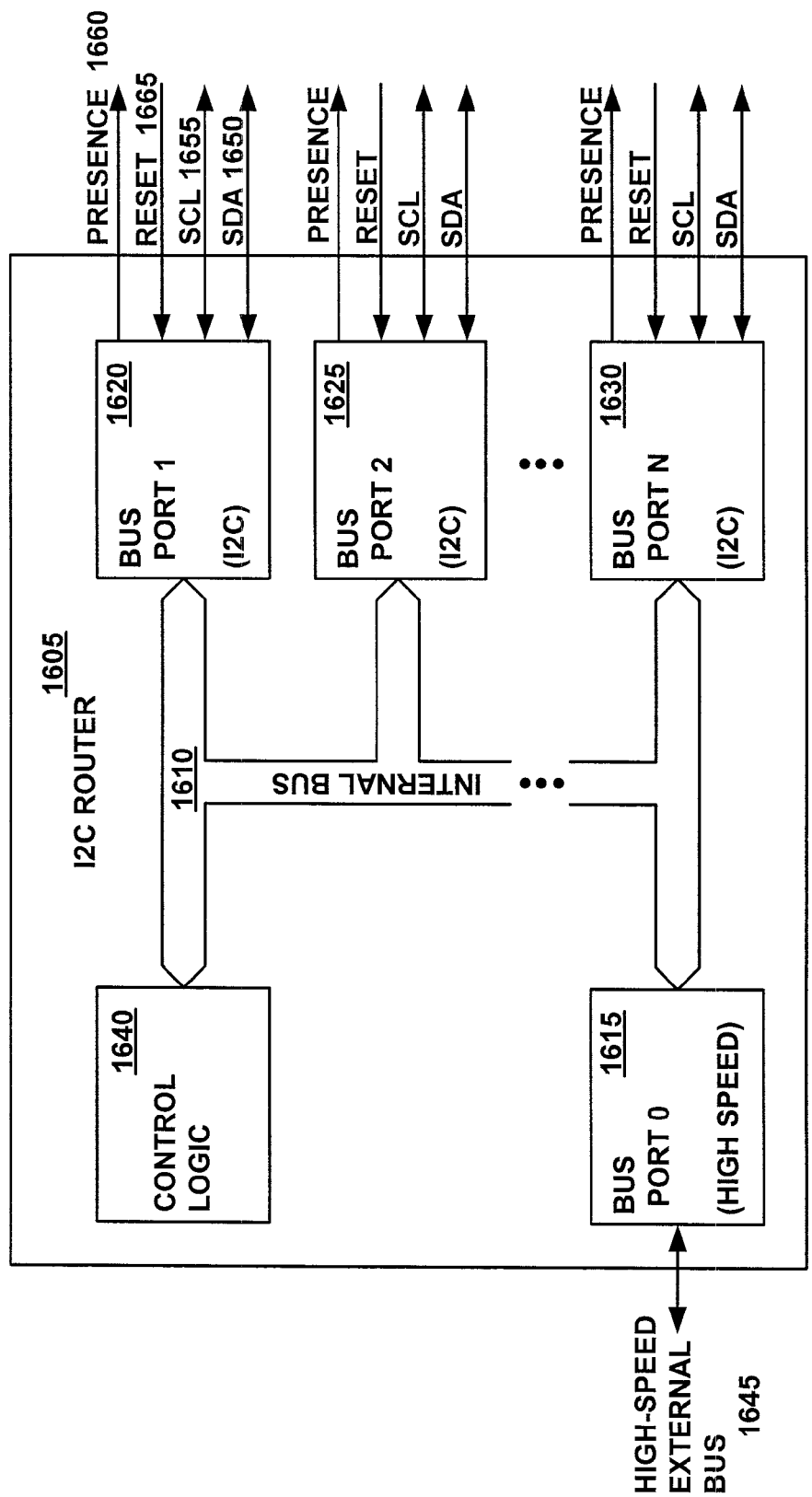
FIG. 16 shows a block diagram of an I2C router, in accordance with an embodiment of the invention.

Embodiments of the invention provide for detecting a device (e.g., field replaceable unit) coupled to an inter-integrated circuit (I2C) router and/or resetting the device. Referring now to FIG. 16, a block diagram of an I2C router 1605, in accordance with an embodiment of the invention, is shown. As depicted in FIG. 16, the I2C router 1605 comprises an internal bus 1610, a plurality of bus ports 1615-1630, and a control logic 1640. The internal bus 1610 communicatively couples the plurality of bus ports 1615-1630 and the control logic 1640. The plurality of bus ports 1615-1630 comprise a high-speed external bus port 1615 and a plurality of I2C bus ports 1620-1630 (e.g., sixteen I2C bus port interfaces).

The internal bus 1610 comprises a bi-directional high-speed communication path. In one embodiment, the high-speed communication path comprises a bi-directional parallel bus (e.g., speedway), or the like. In one implementation, the bi-directional parallel bus comprises eight data lines, two address lines, and five control lines (e.g., read, write, enable, interrupt, and reset). The bandwidth of the internal bus 1610 is sufficient to enable high-speed communication between devices coupled to the I2C router 1605.

The control logic 1640 implements the logic for controlling communication on the plurality of bus ports 1615-1630, detecting a device coupled to one or more of the I2C bus ports 1620-1630, and/or resetting a device on one or more of the I2C bus ports 1620-1630. The control logic 1640 may be centralized within the I2C router 1605 or distributed among each of the plurality of bus ports 1615-1630.

The high-speed external bus port 1615 comprises an interface for controlling communication between the I2C router 1605 and a high-speed external bus. The high-speed external bus comprises a communication path between a coupled external device and the I2C router 1605. The high-speed external bus may be a parallel bus, a high-speed I2C bus (e.g., 1.4 MHz), or the like. Each I2C bus port 1620-1630 comprises an interface for controlling communication between the I2C router and a corresponding sectioned (e.g., segregated) I2C bus. The I2C buses each comprise a communication path between one or more coupled device and the I2C router 1605. The I2C router 1605 receives one or more data packets on any one of the plurality of bus ports 1620-1630 and forwards the packets to the correct destination bus port 1615-1630. Accordingly, the I2C router 1605 provides for communication between a device coupled to the high-speed external bus and devices coupled to any one of the I2C buses, and/or a device coupled to a first one of the I2C buses and another device coupled to any other of the I2C buses.

Each I2C bus port 1620-1630 comprises a serial data line (SDA) 1650 and a serial clock line (SCL) 1655 that provide for bi-directional communication. Each I2C bus port 1620 further comprises a presence line 1660 and a reset line 1665. In one embodiment, the presence line 1665 is active low into the bus port 1620 and the reset line 1665 is active high out of the bus port 1620. More specifically, the presence line 1660 is biased at a high level (e.g., a pull-up resistor to an appropriate supply voltage) by the I2C bus port 1620 or the control logic 1640. If a device is coupled to the I2C bus port 1620 and the device is functioning, the device drives the presence line 1660 low. If a device is not coupled to the I2C bus port 1620 or is not functioning, the presence line 1660 remains biased high. Thus, the I2C router 1605 is readily able to determine the presence of an operational device coupled to a given I2C bus port 1620 as a function of the state of the corresponding presence line 1660.

Similarly, the reset line 1665 is biased at a low level (e.g., a pull-down resistor to ground) by the I2C bus port 1620. If a reset condition is determined by the I2C router, the I2C bus port 1620 or the control logic 1640 drives the reset line 1665 high for a desired (e.g., pre-defined) period of time. Upon sensing the high state of the reset line 1665, a device coupled to the I2C bus port 1620 will perform a reset process.

Figure 17A:
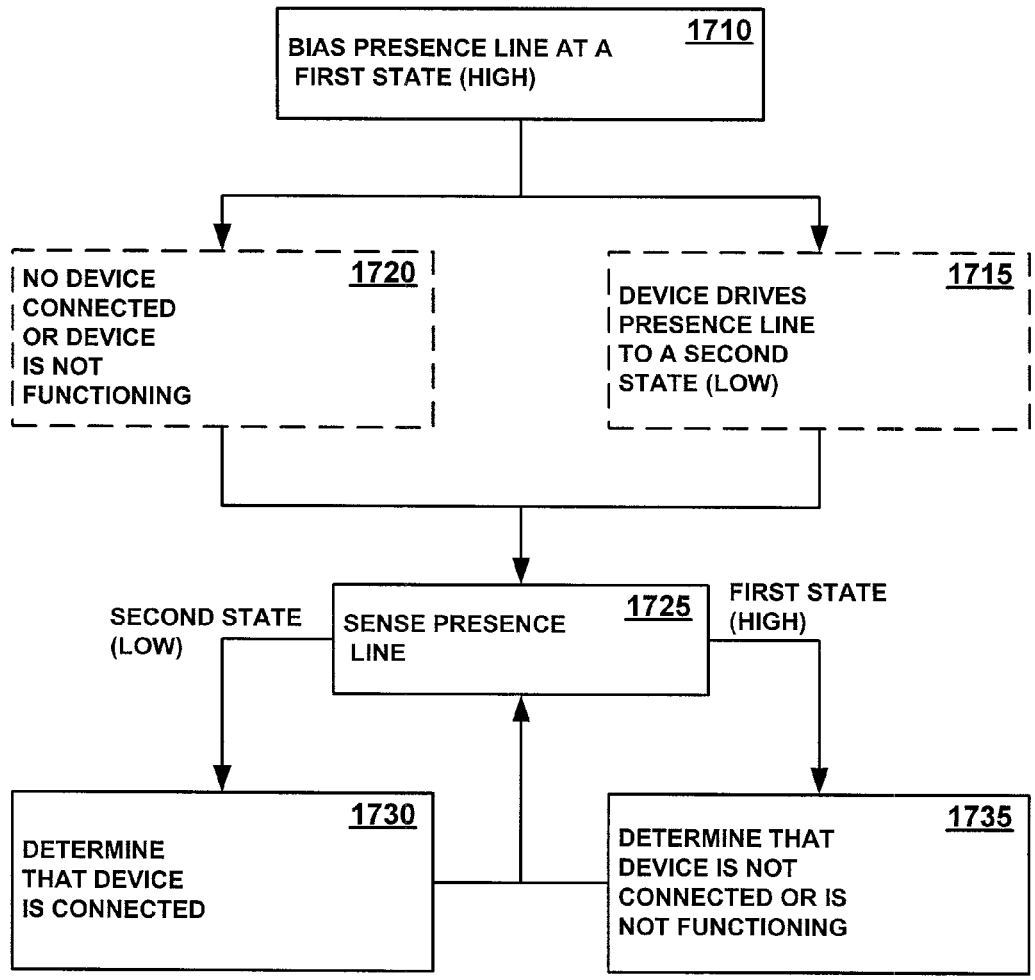
FIG. 17A shows a flow diagram of a method of detecting the presence of a device coupled to an I2C router, in accordance with an embodiment of the invention.

Referring now to FIG. 17A, a flow diagram of a method of detecting the presence of a device (e.g., field replaceable unit) coupled to an inter-integrated circuit (I2C) router, in accordance with an embodiment of the invention, is shown. As depicted in FIG. 17A, the method comprises biasing the presence line at a first state, at 1710. In one implementation, the presence line is biased by pulling the presence line high (e.g., a pull-up resistor coupled to an appropriate power supply).

At 1715, the presence line is driven to a second state by a functioning device coupled to the presence line. In one implementation, the functional device drives the presence line low. Alternatively at 1720, if a device is not connected to the presence line or the device is not functioning, the presence line remains at the first state.

At 1725, the I2C router senses the presence line. If the presence line is at the second state, the I2C router determines that a device is present and/or functional, at 1730. If the presence line is at the first state, the I2C router determines that a device is not connected or that the device is not functional, at 1735. Upon determining if a device is or is not present and/or function, the method returns to 1725.

Figure 17B:
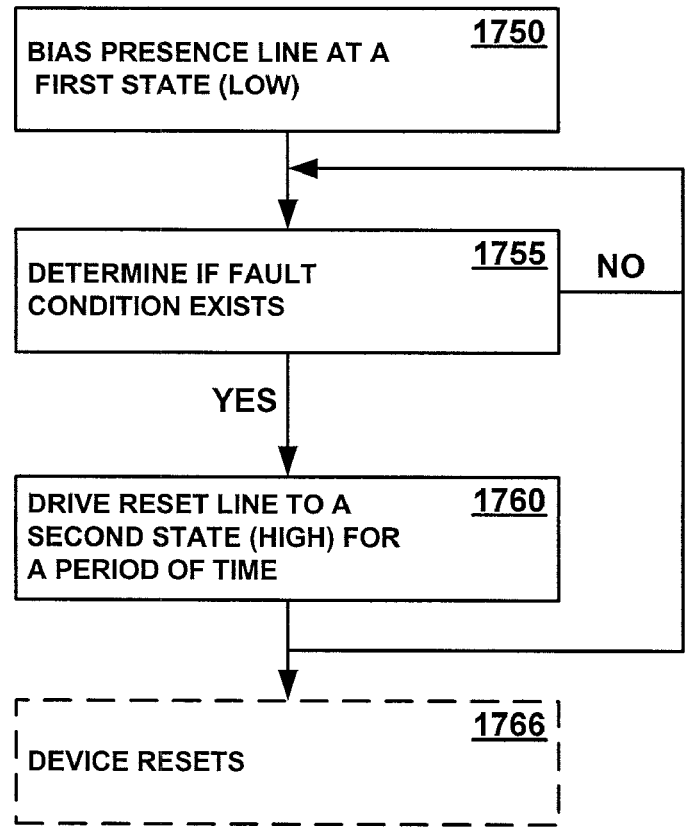
FIG. 17B shows a flow diagram of a method of resetting a device coupled to an I2C router, in accordance with an embodiment of the invention.

Referring now to FIG. 17B, a flow diagram of a method of resetting a device (e.g., field replaceable unit) coupled to an inter-integrated circuit (I2C) router, in accordance with an embodiment of the invention, is shown. As depicted in FIG. 17B, the method comprises biasing the reset line at a first state, at 1750. In one implementation, the reset line is biased by pulling the reset line low (e.g., a pull-down resistor coupled to a ground).

At 1755, the I2C router determines if a reset condition exists. In one implementation, a reset condition comprises a reported error as described above with respect to FIGS. 13 and 14.

At 1760, the reset line is driven to a second state for a desired period (e.g., pre-defined) of time if a reset condition exists. In one implementation, the I2C router drives the reset line high if a reset condition exists.

At 1765, a device coupled to the reset line executes a reset process when the reset line is driven low. If no reset condition is determined or after the reset line is driven low in response to a reset condition the method returns to step 1755.

In another embodiment the function of the presence and reset are implemented utilizing a single line. Furthermore, embodiments of the invention may implement the method of detecting the presence of a device only, the method of resetting a device upon determination of a reset condition only, or both the method of detecting the presence of a device and resetting the same device or another device.

Accordingly, embodiments of the invention are advantageous in that a device that is not functioning can be reset. Embodiments of the invention are also advantageous in that a device which has taken over control of the I2C bus can be reset. Upon resetting the device, the I2C bus is released. Embodiments of the invention are also advantageous in that a non-responsive device can be detected. The ability to detect and/or reset a device coupled to the I2C router readily improves the robustness of the system.

System and Method for Analysis of I2C Router

Figure 18:
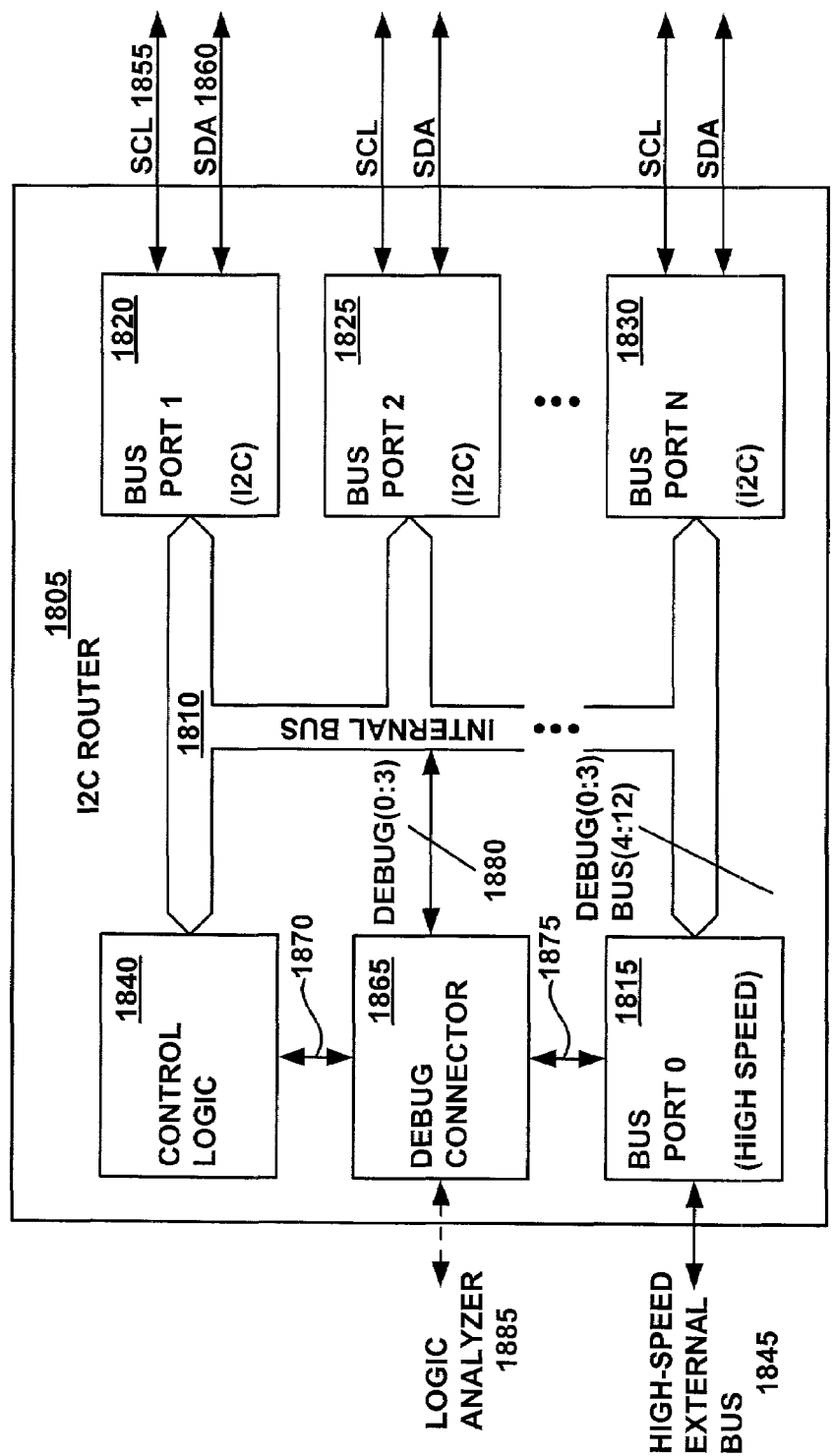
FIG. 18 shows a block diagram of an I2C router, in accordance with an embodiment of the invention.

Embodiments of the invention provide for readily analyzing and debugging an inter-integrated circuit (I2C) router. Referring to FIG. 18, a block diagram of an I2C router 1805, in accordance with an embodiment of the invention, is shown. As depicted in FIG. 18, the I2C router 1805 comprises an internal bus 1810, a plurality of bus ports 1815-1830, a control logic 1840, and a debug connector 1865. The internal bus 1810 communicatively couples the plurality of bus ports 1815-1830 and the control logic 1940. The plurality of bus ports 1815-1830 comprise a high-speed external bus port 1815 and a plurality of I2C bus ports 1820-1830 (e.g., sixteen I2C bus ports).

The internal bus 1810 comprises a bi-direction high-speed communication path and a plurality of debug lines. In one embodiment, the high-speed communication path comprises a bi-direction parallel bus (e.g., speedway), or the like. In one implementation, the bi-direction parallel bus comprises eight data lines, two address lines, five control lines (e.g., read, write, enable, interrupt and reset) and four general purpose input/output lines. In one embodiment, the general purpose input/output lines are designated as debug lines 1880 (e.g., debug (0:3)). The bandwidth of the internal bus 1810 is sufficient to enable high-speed communication between devices (e.g., field replaceable units) coupled to the I2C router 1805.

The control logic 1840 implements the logic for controlling communication on the plurality of port interfaces 1815-1830. The control logic 1840 may be centralized within the I2C router 1805 or distributed among each of the plurality of bus ports 1815-1830.

The high-speed external bus port interface 1815 comprises an interface for controlling communication between the I2C router 1805 and a high-speed external bus 1845. The high-speed external bus 1845 comprises a communication path between an coupled external device and the I2C router 1805. The high-speed external bus 1845 may be a parallel bus, a high-speed I2C bus (e.g., 1.4 MHz), or the like. Each I2C bus port 1820 comprises an interface for controlling communication between the I2C router 1805 and a corresponding sectioned (e.g., segmented) I2C bus 1855-1860. Each I2C bus port 1820-1830 comprises a serial data line (SDA) 1860 and a serial clock lines (SDL) 1865 that provide for bi-directional communication. The I2C buses each comprise a communication path between one or more coupled devices and the I2C router 1805. The I2C router 1805 receives one or more packets on any one of the plurality of bus ports 1815-1830 and forwards the packets to the correct destination bus port 1815-1830. Accordingly, the I2C router 1805 provides for communication between a device coupled to the high-speed external bus 1815 and devices coupled to any one of the I2C buses 1820-1830, and/or a device coupled to a first one of the I2C buses 1820-1830 and another device coupled to any other of the I2C buses 1820-1830.

The debug connector 1865 provides for coupling a logic analyzer 1885 or the like, to one or more of a plurality of analysis lines 1870-1880. The debug connector 1865 may also provide for coupling the logic analyzer 1885 to the internal bus 1810. The plurality of analysis lines 1870-1880 comprise the plurality of debug lines (e.g., debug (0:3)) 1880, one or more control logic analysis lines 1870, and/or one or more high-speed external bus port analysis lines 1875. Thus, the debug connector 1865 allows for the trapping and analysis, in a standard manner, of traffic passing through the I2C router 1805 to any bus port 1815-1830. In addition, signals on the analysis lines 1870-1880 may be generated by debug firmware for setting breakpoints and traps. The I2C router 1805, comprising the internal bus (e.g., parallel bus) 1810 and debug connector 1865, readily allow isolation of traffic to and/or from an individual bus port 1815-1830 and ready analysis of data on a byte by byte bases. Therefore, generation and control of complex state conditions necessary for analysis of serial signals are not necessary.

Figure 19:
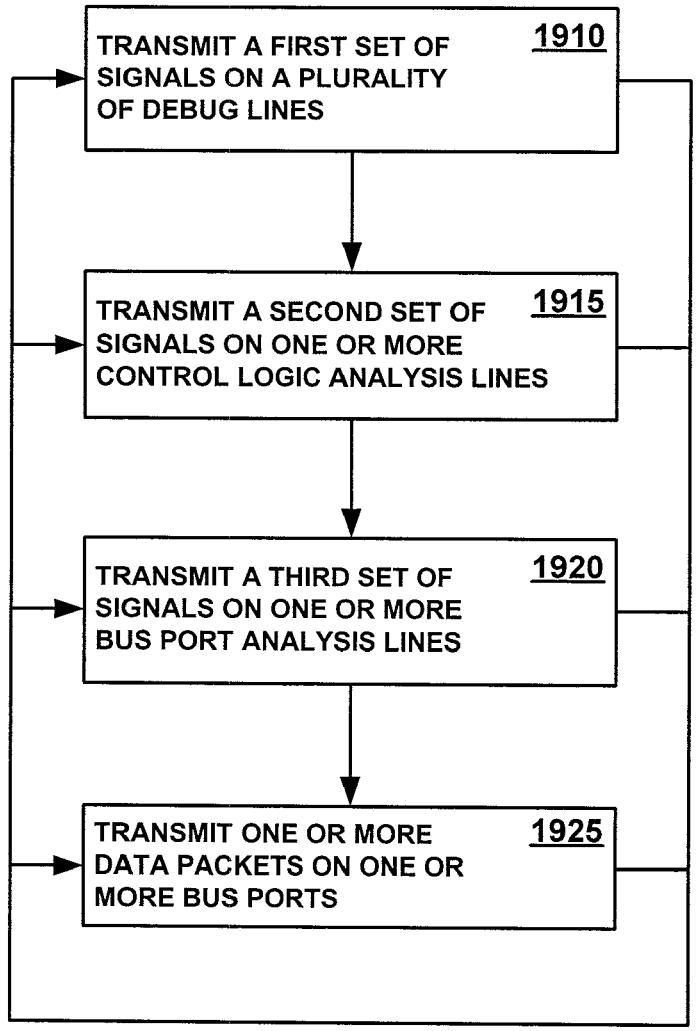
FIG. 19 shows a flow diagram of a method of analyzing traffic in an I2C router, in accordance with an embodiment of the invention.

Referring now to FIG. 19, a flow diagram of a method of analyzing traffic in an inter-integrated (I2C) router, in accordance with an embodiment of the invention, is shown. As depicted in FIG. 19, the method comprises transmitting a first set of signals on a plurality of debug lines coupled to one or more bus ports, at 1910. Transmitting comprises sending and/or receiving signals. In an exemplary implementation, one or more signals are transmitted on the debug lines to set the state of one or more elements of one or more bus ports and/or to determine the state of one or more elements of one or more of the bus ports.

The method may further comprise transmitting a second set of signals on one or more control logic analysis lines, at 1915. In an exemplary implementation, one or more signals are transmitted on the one or more control logic analysis lines to set the state of one or more elements of the control logic and/or to determine the state of one or more elements of the control logic. The method may further comprise transmitting a third set of signals on one or more bus port analysis lines, at 1920. In an exemplary implementation, one or more signals are transmitted on the one or more bus port analysis lines to set the state of one or more elements of the bus ports and/or to determine the state of one or more elements of the bus ports.

The method may further comprise transmitting data packets on one or more bus ports, at 1925. The bus ports may comprise a high-speed bus port and/or a plurality of I2C bus ports. Furthermore, one or more of elements 1910-1925 of the method may be performed individually, in combination with each other, sequentially, in parallel with each other, and/or any combination thereof.

Accordingly, embodiments of the invention advantageously provide for readily analyzing and debugging communications passing through I2C routers. Embodiments of the invention advantageously allow for setting breakpoints and traps. Embodiments of the invention also advantageously allow readily detecting destination and source addresses of data packet traffic.

Embodiments of the present invention, an inter-integrated circuit router for providing increased security, have been described. While the present invention has been described in particular embodiments, it should be appreciated that the present invention should not be construed as limited by such embodiments, but rather construed according to the following Claims.

What is claimed is:

1. An inter-integrated circuit port comprising:

an electrical connector for communicative coupling to an inter-integrated circuit bus;

a controller coupled to said electrical connector for controlling communication of data through said electrical connector based on control information such that communication to any address designated by said control information is allowed to pass through said inter-integrated circuit port while communication to all other address not designated by said control information is not allowed to pass through said inter-integrated circuit port; and a mask coupled to said controller for providing said control information to said controller, wherein said mask comprises a first mask register configured for storing a designated address to which data communication can be transmitted through said electrical connector and a second mask register for designating Do Not Care bits which are used in conjunction with said designated address to define a range of addresses to which data communication can be transmitted through said electrical connector.

2. The inter-integrated circuit port as recited in claim 1 wherein said first mask register comprises one byte for storing an address to which data communication can be transmitted through said electrical connector.

3. The inter-integrated circuit port as recited in claim 1 wherein said first mask register comprises two bytes for storing at least one address to which data communication can be transmitted through said electrical connector.

4. The inter-integrated circuit port as recited in claim 1 wherein said first mask register is stored within memory of said controller.

5. The inter-integrated circuit port as recited in claim 1 further comprising an XOR and AND logic circuit for comparing an address to said control information.

6. An inter-integrated circuit router comprising:
a high-speed internal bus for communicating data;
at least one inter-integrated circuit port coupled to said high-speed internal bus, said inter-integrated circuit port operable to provide said communicating of said data between said high-speed internal bus and an inter-integrated circuit bus segment based on control information, wherein said inter-integrated circuit port includes:
an electrical connector for communicative coupling to an inter-integrated circuit bus;
a controller coupled to said electrical connector for controlling communication of data through said electrical connector based on said control information such that communication to any address designated by said control information is allowed to pass through said inter-integrated circuit port while communication to all other address not designated by said control information is not allowed to pass through said inter-integrated circuit port; and
a mask coupled to said controller for providing said control information to said controller, wherein said mask comprises a first mask register configured for storing a designated address to which data communication can be transmitted through said electrical connector and a second mask register for designating Do Not Care bits which are used in conjunction with said designated address to define a range of addresses to which data communication can be transmitted through said electrical connector; and
a high-speed external port coupled to said high-speed internal bus, said high-speed external port providing an interface to an external bus.

7. The inter-integrated circuit router as recited in claim 6 wherein said first mask register comprises one byte for storing an address to which data communication can be transmitted through said inter-integrated circuit port.

8. The inter-integrated circuit router as recited in claim 6 wherein said first mask register comprises two bytes for storing at least one address to which data communication can be transmitted through said inter-integrated circuit port.

9. The inter-integrated circuit router as recited in claim 6 wherein wherein said first mask register is stored within memory of control logic of said inter-integrated circuit port.

10. The inter-integrated circuit router as recited in claim 6 further comprising XOR logic and AND logic for comparing an address to said control information.

11. The inter-integrated circuit router as recited in claim 6 further comprising a port identification tag (PIT) register for indicating whether said inter-integrated circuit port is validated for accessing said data communication.

12. A method for controlling data communications over an inter-integrated router, said method comprising:
receiving data at an inter-integrated circuit port from an inter-integrated circuit bus, said data comprising a destination address, wherein said inter-integrated circuit port includes:
an electrical connector for communicative coupling to an inter-integrated circuit bus;
a controller coupled to said electrical connector for controlling communication of data through said electrical connector based on said control information such that communication to any address designated by said control information is allowed to pass through said inter-integrated circuit port while communication to all other address not designated by said control information is not allowed to pass through said inter-integrated circuit port; and
a mask coupled to said controller for providing said control information to said controller, wherein said mask comprises a first mask register configured for storing a designated address to which data communication can be transmitted through said electrical connector and a second mask register for designating Do Not Care bits which are used in conjunction with said designated address to define a range of addresses to which data communication can be transmitted through said electrical connector
comparing said destination address to said control information of said inter-integrated circuit port, wherein said comparing is performed at said controller by comparing said destination address to said designated address and said Do Not Care bits to determine if said destination address can be transmitted through said inter-integrated circuit port; and
providing said comparing indicates that transmission through said inter-integrated circuit port is permitted, transmitting said data through said inter-integrated circuit port.

13. The method as recited in claim 12 wherein said destination address is one byte.

14. The method as recited in claim 12 further comprising:
performing a logical XOR operation of said destination address and said second mask register byte;
performing a logical AND operation of a result of said logical XOR operation and said first mask register byte; and
provided said logical AND operation produces a value of zero, permitting said transmission to said destination address.

15. The method as recited in claim 12 wherein said transmitting comprises indicating in a port identification tag register of said inter-integrated circuit router that said destination address corresponds to said inter-integrated circuit port.

* * * * *

UNITED STATES PATENT AND TRADEMARK OFFICE
CERTIFICATE OF CORRECTION

PATENT NO. : 7,398,345 B2
APPLICATION NO. : 10/461183
DATED : July 8, 2008
INVENTOR(S) : Thane M. Larson et al.

It is certified that error appears in the above-identified patent and that said Letters Patent is hereby corrected as shown below:

On the Title Page Item (56), under "U.S. Patent Documents", line 2,
delete "5,526,464 A    6/1996    Mermelstein" and
insert -- 6,526,464    2/2003    Jobs et al. --, therefor.

In column 7, line 27, delete "253nis" and insert -- 253n) is --, therefor.

In column 25, line 11, delete "1940" and insert -- 1840 --, therefor.

In column 27, line 62, in Claim 9, delete "wherein" before "said".

Signed and Sealed this

Seventh Day of October, 2008

JON W. DUDAS
*Director of the United States Patent and Trademark Office*